United States Patent
Lee

(10) Patent No.: US 9,462,290 B2
(45) Date of Patent: Oct. 4, 2016

(54) METHODS AND APPARATUSES OF ENCODING/DECODING INTRA PREDICTION MODE USING CANDIDATE INTRA PREDICTION MODES

(71) Applicant: Pantech Co., Ltd., Seoul (KR)

(72) Inventor: Sun Young Lee, Seoul (KR)

(73) Assignee: Pantech Co., Ltd., Seoul (KR)

( * ) Notice: Subject to any disclaimer, the term of this patent is extended or adjusted under 35 U.S.C. 154(b) by 642 days.

(21) Appl. No.: 13/646,225

(22) Filed: Oct. 5, 2012

(65) Prior Publication Data

US 2013/0089144 A1 Apr. 11, 2013

(30) Foreign Application Priority Data

Oct. 7, 2011 (KR) .................. 10-2011-0102707
Nov. 25, 2011 (KR) .................. 10-2011-0124663

(51) Int. Cl.
    *H04N 7/32*     (2006.01)
    *H04N 19/463*     (2014.01)
    *H04N 19/593*     (2014.01)
    *H04N 19/70*     (2014.01)

(52) U.S. Cl.
CPC .......... *H04N 19/463* (2014.11); *H04N 19/593* (2014.11); *H04N 19/70* (2014.11)

(58) Field of Classification Search
CPC .. H04N 19/176; H04N 19/463; H04N 19/11; H04N 19/70
USPC ........................................ 375/240.01, 240.12
See application file for complete search history.

(56) References Cited

U.S. PATENT DOCUMENTS

| | | | |
|---|---|---|---|
| 7,933,334 B2 | 4/2011 | Kanehara | |
| 8,000,390 B2 * | 8/2011 | Zhao et al. | 375/240.14 |
| 2005/0089235 A1 | 4/2005 | Sakaguchi et al. | |
| 2006/0215763 A1 | 9/2006 | Morimoto et al. | |
| 2008/0152004 A1 * | 6/2008 | Fujisawa et al. | 375/240.12 |
| 2011/0243225 A1 * | 10/2011 | Min et al. | 375/240.12 |
| 2011/0292994 A1 * | 12/2011 | Lim et al. | 375/240.02 |
| 2012/0082223 A1 * | 4/2012 | Karczewicz | H04N 19/196 375/240.12 |
| 2012/0106636 A1 | 5/2012 | Kim et al. | |

(Continued)

FOREIGN PATENT DOCUMENTS

| | | |
|---|---|---|
| CN | 101605255 | 12/2009 |
| JP | 2006-128770 | 5/2006 |

(Continued)

OTHER PUBLICATIONS

International Search Report issued for related International Application No. PCT/KR2012/008106 dated Jan. 17, 2013.

(Continued)

*Primary Examiner* — Jay Patel
*Assistant Examiner* — Francis G Geroleo
(74) *Attorney, Agent, or Firm* — H.C. Park & Associates, PLC

(57) ABSTRACT

A method and an apparatus of encoding/decoding intra prediction mode using a plurality of candidate intra prediction modes are disclosed. A method of decoding an intra prediction mode can comprise deriving three candidate intra prediction modes about a current block and deriving an intra prediction mode of the current block. Therefore, by predicting an intra prediction mode of the current block based on a plurality of candidate intra prediction modes, video encoding efficiency can be improved.

11 Claims, 16 Drawing Sheets

(56) References Cited

U.S. PATENT DOCUMENTS

| | | | |
|---|---|---|---|
| 2012/0177113 A1* | 7/2012 | Guo et al. | 375/240.12 |
| 2012/0314766 A1* | 12/2012 | Chien et al. | 375/240.12 |
| 2012/0328009 A1* | 12/2012 | Sasai et al. | 375/240.12 |
| 2013/0259128 A1* | 10/2013 | Song et al. | 375/240.12 |
| 2013/0266064 A1* | 10/2013 | Zhang et al. | 375/240.12 |
| 2013/0272401 A1* | 10/2013 | Seregin et al. | 375/240.12 |
| 2014/0133558 A1* | 5/2014 | Seregin et al. | 375/240.12 |
| 2014/0269914 A1* | 9/2014 | Oh et al. | 375/240.12 |

FOREIGN PATENT DOCUMENTS

| | | |
|---|---|---|
| KR | 10-2005-0012762 | 2/2005 |
| KR | 10-2007-0051807 | 5/2007 |
| KR | 10-2009-0012985 | 2/2009 |
| WO | 2011/004986 | 1/2011 |
| WO | 2012/170812 | 12/2012 |
| WO | 2013-002556 | 1/2013 |
| WO | 2013-037489 | 3/2013 |
| WO | 2013-062195 | 5/2013 |

OTHER PUBLICATIONS

Chien et al., "Parsing friendly infra mode coding", Joint Collaborative Team on Video Coding(JCT-VC) of ITU-T SG16 WP3 and ISO/IEC JTC1/SC29/WG11, 6th Meeting, Jul. 2011, Torino, IT.

Mei Guo et al., "Improved Intra Mode Coding", Joint Collaborative Team on Video Coding(JCT-VC) of ITU-T SG16 WP3 and ISO/IEC JTC1/SC29/WG11, 4th Meeting, Jan. 2011, Daegu, Korea.

Tzu-Der Chuang et al., "Luma Intra Predicton Mode Coding", Joint Collaborative Team on Video Coding(JCT-VC) of ITU-T SG16 WP3 and ISO/IEC JTC1/SC29/WG11, 6th Meeting, Jul. 2011, Torino, IT.

Edouard Francois et al., "Modified Intra Mode Coding", Joint Cllaborative Team on Video Coding(JCT-VC) of ITU-T SG16 WP3 and ISO/IEC JTC1/SC29/WG11, 6th Meeting,Jul. 2011, Torino, IT.

Torn Kumakura et al., "Fixing the number of mpm candidates", Joint Collaborative Team on Video Coding(JCT-VC) of ITU-T SG16 WP3 and ISO.IEC JTC1/SC29/WG11, 6th Meeting, Jul. 2011, Torino, IT.

Edouard Francois et al., "CE6b: Mode ranking for remaining mode coding with 2 or 3 MPMs", Joint Collaborative Team on Video Coding (JCT-VC) of ITU-T SG16 WP3 and ISO/IEC JTC1/SC29/WG11, 7th Meeting, Nov. 2011, Geneva, CH.

Extended European search report issued on Oct. 28, 2015, in European Patent Application No. 12838418.7.

Bross et al., "High Efficiency Video Coding (HEVC) text specification draft 6", Joint Collaborative Team on Video Coding(JCT-VC) of ITU-T SG16 WP3 and ISO/IEC JTC1/SC29/WG11, 7th Meeting, Nov. 21-30, 2011, Geneva CH.

Zhang et al., "Intra mode coding with fixed length binarization", Joint Collaborative Team on Video Coding(JCT-VC) of ITU-T SG16 WP3 and ISO/IEC JTC1/SC29/WG11, 8th Meeting, Nov. 21-30, 2011, San Jose, CA.

Wiegand et al., "WD3: Working Draft 3 of High-Efficiency Video Coding" Joint Collaborative Team on Video Coding (JCT-VC) of ITU-T SG16 WP3 and ISO/IEC JTC1/SC29/WG11, 5th Meeting, Mar. 16-23, 2011, Geneva CH.

* cited by examiner

METHODS AND APPARATUSES OF ENCODING/DECODING INTRA PREDICTION MODE USING CANDIDATE INTRA PREDICTION MODES

CROSS REFERENCE TO RELATED APPLICATIONS

This application claims priority from and the benefit under 35 U.S.C. §119(a) of Korean Patent Application No. 10-2011-0102707, filed on Oct. 7, 2011, and Korean Patent Application No. 10-2011-0124663, filed on Nov. 25, 2011, both of which are incorporated herein by reference for all purposes as if fully set forth herein.

BACKGROUND

1. Field

The present disclosure relates to a method and apparatus of encoding and decoding video, and more particularly, to a method and apparatus of encoding and decoding an intra prediction mode using a plurality of candidate intra prediction modes.

2. Discussion of the Background

Needs for high resolution, high quality video, such as HD (High Definition) and UHD (Ultra High Definition) video, are increasing in various application areas. Higher resolution, higher quality video inevitably causes increase in the amount of data compared with the existing video data; therefore, when video data are transmitted by using a medium, such as the existing wired or wireless broadband system, or video data are stored by using the existing storage media, costs for transmission and storage also increase. To address the above mentioned problems caused by a widespread use of high resolution, high quality video data, high efficient video compression technologies may be employed.

Various technologies may be employed for video compression: inter prediction technology for predicting pixel values of a current picture from the picture encoded before or after the current picture, intra prediction technology for predicting pixel values of a current picture by using pixel information within the current picture, an entropy encoding method for assigning symbols of short length to those values appearing more frequently while assigning symbols of long length to those values appearing less frequently, and so on. By using the video compression technologies as introduced above, video data can be more efficiently compressed for the transmission or the storage of the video data. However, there is a need for more improved compression technologies.

SUMMARY

Exemplary embodiments of the present invention provide a method of encoding and decoding an intra prediction mode for a current block.

Exemplary embodiments of the present invention provide an apparatus carrying out a method of encoding and decoding an intra prediction mode for a current block.

Additional features of the invention will be set forth in the description which follows, and in part will be apparent from the description, or may be learned by practice of the invention.

Exemplary embodiments of the present invention provide a method of decoding an intra prediction mode of a current block comprising: determining whether a first intra prediction mode derived from a first neighboring block located at the left side of the current block is identical to a second intra prediction mode derived from a second neighboring block located at the upper side of the current block; in response to a determination that the first intra prediction mode is not identical to the second intra prediction mode, deriving a first candidate intra prediction mode from the first intra prediction mode and deriving a second candidate intra prediction mode from the second intra prediction mode; and based on priority of order among a planar mode, a DC mode, and a vertical mode, deriving an intra prediction mode different from the first candidate intra prediction mode and the second candidate intra prediction mode into a third candidate intra prediction mode. The deriving of the intra prediction mode comprises deriving the planar mode into the third candidate intra prediction mode if the first candidate intra prediction mode and the second candidate intra prediction mode are not the planar mode; deriving the DC mode into the third candidate intra prediction mode if one of the first candidate intra prediction mode and the second candidate intra prediction mode is the planar mode and the other is not the DC mode; and deriving the vertical mode into the third candidate intra prediction mode if one of the first candidate intra prediction mode and the second candidate intra prediction mode is the planar mode and the other is the DC mode. The first neighboring block corresponds to a current block including a pixel positioned at (x−1, y) when the position of a pixel in the upper left side of the current block is (x, y); and the second neighboring block corresponds to a current block including a pixel positioned at (x, y−1) when the position of a pixel in the upper left of the current block is (x, y), where the x and y are an integer value. The method of decoding an intra prediction mode of a current block may comprise decoding information indicating whether one of the first candidate intra prediction mode, the second candidate intra prediction mode, and the third candidate intra prediction mode is identical to an intra prediction mode of the current block; and if one of the first candidate intra prediction mode, the second candidate intra prediction mode, and the third candidate intra prediction mode is identical to an intra prediction mode of the current block, deriving an intra prediction mode of the prediction mode based on the identical one from among the three candidate intra prediction modes. The method of decoding an intra prediction mode of a current block may comprise decoding information indicating whether one of the first candidate intra prediction mode, the second candidate intra prediction mode, and the third candidate intra prediction mode is identical to an intra prediction mode of the current block; and if the first candidate intra prediction mode, the second candidate intra prediction mode, and the third candidate intra prediction mode are not the same as an intra prediction mode of the prediction mode, deriving an intra prediction value of the current block based on the remaining intra prediction mode different from the first candidate intra prediction mode, the second candidate intra prediction mode, and the third candidate intra prediction mode. In the method of decoding an intra prediction mode, the deriving of the intra prediction mode of the current block based on the remaining intra prediction mode different from the first candidate intra prediction mode, the second candidate intra prediction mode, and the third candidate intra is prediction mode if the first candidate intra prediction mode, the second candidate intra prediction mode, and the third candidate intra prediction mode are not the same as an intra prediction mode of the prediction mode may further comprise deriving an intra prediction mode of the current block by comparing the remaining intra prediction mode with the first candidate intra prediction mode, the second candidate intra prediction mode, and the third candidate intra prediction mode.

Exemplary embodiments of the present invention provide a method of decoding an intra prediction mode comprising: determining whether a first intra prediction mode derived from a first neighboring block located at the left side of the current block is identical to a second intra prediction mode derived from a second neighboring block located at the upper side of the current block; in response to a determination that the first intra prediction mode is identical to the second intra prediction mode and the first intra prediction mode is a planar mode or a DC mode, deriving a first candidate intra prediction mode into the planar mode; deriving a second candidate intra prediction mode into the DC mode; and deriving a third candidate intra prediction mode into a vertical mode. The method of decoding an intra prediction mode of a current block may comprise decoding information indicating whether one of the first candidate intra prediction mode, the second candidate intra prediction mode, and the third candidate intra prediction mode is identical to an intra prediction mode of the current block; and if one of the first candidate intra prediction mode, the second candidate intra prediction mode, and the third candidate intra prediction mode is identical to an intra prediction mode of the current block, deriving an intra prediction mode of the current block based on the one of the three candidate intra prediction modes. The method of decoding an intra prediction mode of a current block may comprise decoding information indicating whether one of the first candidate intra prediction mode, the second candidate intra prediction mode, and the third candidate intra prediction mode is identical to an intra prediction mode of the current block; and if the first candidate intra prediction mode, the second candidate intra prediction mode, and the third candidate intra prediction mode are not the same as an intra prediction mode of the current block, deriving an intra prediction mode of the current block based on the remaining intra prediction mode different from the first candidate intra prediction mode, the second candidate intra prediction mode, and the third candidate intra prediction mode. In the method of decoding an intra prediction mode, the deriving an intra prediction value of the current block based on the remaining intra prediction mode different from the first candidate intra prediction mode, the second candidate intra prediction mode, and the third candidate intra prediction mode if the first candidate intra prediction mode, the second candidate intra prediction mode, and the third candidate intra prediction mode are not the same as an intra prediction mode of the current block may further comprise deriving an intra prediction mode of the current block by comparing the remaining intra prediction mode with the first candidate intra prediction mode, the second candidate intra prediction mode, and the third candidate intra prediction mode. The first neighboring block corresponds to a current block including a pixel positioned at (x−1, y) when the position of a pixel in the upper left side of the current block is (x, y); and the second neighboring block corresponds to a current block including a pixel positioned at (x, y−1) when the position of a pixel in the upper left of the current block is (x, y), where the x and y are an integer value.

Exemplary embodiments of the present invention provide an image decoding apparatus comprising: an entropy decoding unit configured to decode information indicating whether one candidate intra prediction mode from among a first candidate intra prediction mode, a second candidate intra prediction mode, and a third candidate prediction mode is identical to an intra prediction mode of a current block, the first, second, and third candidate intra prediction modes being three intra prediction modes for the current block; and a predictor configured to derive an intra prediction mode of the current block based on the information, wherein, if a first intra prediction mode derived from a first neighboring block located at the left side of the current block is not identical to a second intra prediction mode derived from a second neighboring block located at the upper side of the current block, the first candidate intra prediction mode is derived from the first intra prediction mode; the second candidate intra prediction mode is derived from the second intra prediction mode; and, based on priority of order of a planar mode, a DC mode, and a first mode, an intra prediction mode different from the first candidate intra prediction mode and the second candidate intra prediction mode is derived into the third candidate intra prediction mode. The third candidate intra prediction mode is derived into the planar mode if the first candidate intra prediction mode and the second candidate intra prediction mode are not the planar mode; the third candidate intra prediction mode is derived into the DC mode if one of the first candidate intra prediction mode and the second candidate intra prediction mode is the planar mode and the other is not the DC mode; and the third candidate intra prediction mode is derived into the vertical mode if one of the first candidate intra prediction mode and the second candidate intra prediction mode is the planar mode and the other is the DC mode. The first neighboring block corresponds to a current block including a pixel positioned at (x−1, y) when the position of a pixel in the upper left side of the current block is (x, y); and the second neighboring block corresponds to a current block including a pixel positioned at (x, y−1) when the position of a pixel in the upper left of the current block is (x, y), where the x and y are an integer value. The predictor, if one of the three candidate intra prediction modes is identical an intra prediction mode of the current block, derives an intra prediction mode of the current block based on the one of the three candidate intra prediction modes; and if none of the three candidate intra prediction modes is not identical to an intra prediction mode of the current block, derives an intra prediction mode of the current block based on the remaining intra prediction mode different from the first candidate intra prediction mode, the second candidate intra prediction mode, and the third candidate intra prediction mode. The predictor, if none of the three candidate intra prediction modes is identical to an intra prediction mode of the current block, derives an intra prediction mode of the current block by comparing the remaining intra prediction mode with the first candidate intra prediction mode, the second candidate intra prediction mode, and the third candidate intra prediction mode.

Exemplary embodiments of the present invention provide an image decoding apparatus comprising: an entropy decoding unit configured to decode information indicating whether one candidate intra prediction mode from among a first candidate intra prediction mode, a second candidate intra prediction mode, and a third candidate prediction mode is identical to an intra prediction mode of a current block, the first, second, and third candidate intra prediction modes being three candidate intra prediction modes for the current block; and a predictor configured to determine whether a first intra prediction mode derived from a first neighboring block located at the left side of the current block is identical to a second intra prediction mode derived from a second neighboring block located at the upper side of the current block, wherein, if the first intra prediction mode is identical to the second intra prediction mode and the first intra prediction mode is a planar mode, a first candidate intra prediction mode is derived as the planar mode and a second candidate intra prediction mode is derived as a DC mode and a third candidate prediction mode is derived as a vertical mode. The predictor, if one of the three candidate intra prediction modes is identical to an intra prediction mode of the current block, is configured to derive an intra prediction mode of the current block based on the one of the three candidate intra prediction modes; and if none of the three candidate intra prediction modes is identical to an intra prediction mode of the current block, the predictor is configured to derive an intra prediction mode of the current block based on the remaining intra prediction mode different from the first candidate intra prediction mode, the second candidate intra prediction mode, and the third candidate intra prediction mode. The predictor, if none of the three candidate intra prediction modes is identical to an intra prediction mode of the current block, is configured to derive an intra prediction mode of the current block by comparing the remaining intra prediction mode with the first candidate intra prediction mode, the second candidate intra prediction mode, and the third candidate intra prediction mode. The current block is such that the first neighboring block corresponds to a current block including a pixel positioned at (x−1, y) when the position of a pixel in the upper left side of the current block is (x, y); and the second neighboring block corresponds to a current block including a pixel positioned at (x, y−1) when the position of a pixel in the upper left of the current block is (x, y), where the x and y are an integer value.

According to aspects of the present invention, a method of encoding and decoding an intra prediction mode by using a plurality of candidate intra prediction modes and an apparatus using the method can represent an intra prediction mode of a current block by using a short codeword and predict an intra prediction mode of a current block based on a plurality of candidate intra prediction modes, thereby improving video encoding efficiency.

It is to be understood that both forgoing general descriptions and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompany drawings, which are included to provide a further understanding of this document and are incorporated on and constitute a part of this specification illustrate embodiments of the invention and together with the description serve to explain the principles of the invention.

DETAILED DESCRIPTION OF THE ILLUSTRATED EMBODIMENTS

Figure 1:
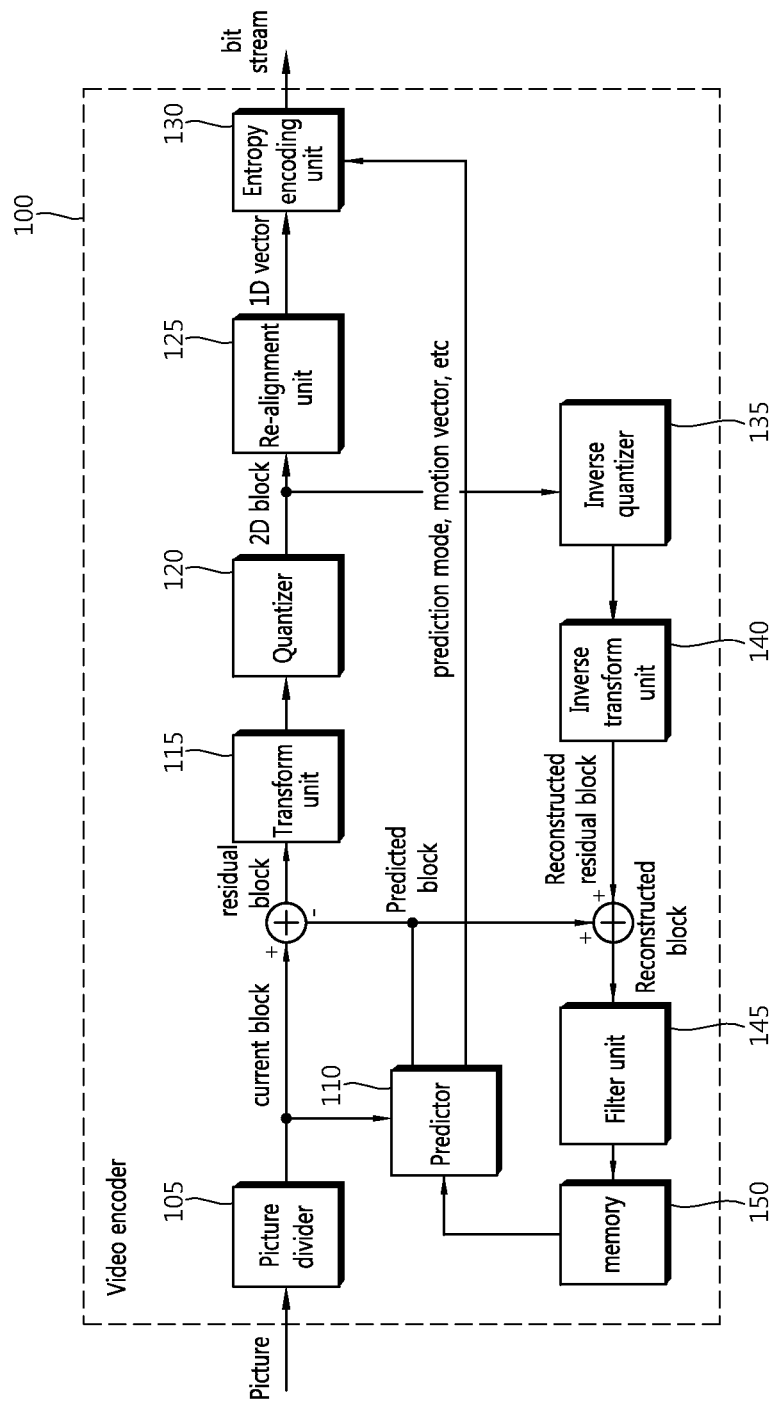
FIG. 1 is a block diagram of a video encoder according to an exemplary embodiment of the present invention.

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

In case it is mentioned that a certain component is "connected" or "accessed" to another component, it may be understood that the certain component is directly connected or accessed to the another component or that a component is interposed between the components. On the contrary, in case it is mentioned that a certain component is "directly connected" or "directly accessed" to another component, it should be understood that there is no component therebetween.

Terms used in the present invention is to merely explain specific embodiments, thus it is not meant to be limiting. A singular expression includes a plural expression unless two expressions are contextually different from each other. In the present invention, a term "include" or "have" is intended to indicate that characteristics, figures, steps, operations, components, elements disclosed on the specification or combinations thereof exist. Rather, the term "include" or "have" should be understood so as not to preclude existence of one or more other characteristics, figures, steps, operations, components, elements or combinations thereof or additional possibility.

Hereinafter, exemplary embodiments of the present invention will be described in detail with reference to appended drawings. In the drawings, the size and relative sizes of layers and regions may be exaggerated for clarity. Like reference numerals in the drawings denote like elements.

FIG. 1 is a block diagram of a video encoder according to an exemplary embodiment of the present invention.

With reference to FIG. 1, a video encoder 100 may include a picture divider 105, a predictor 110, a transform unit 115, a quantizer 120, a re-alignment unit 125, an entropy encoding unit 130, an inverse quantizer 135, an inverse transform unit 140, a filter unit 145, and a memory 150.

The individual unit shown in FIG. 1 has been illustrated independently of each other to emphasize characteristic functions of a video encoder; therefore, it does not mean that each unit is necessarily implemented as separate hardware or software units. In other words, each unit is introduced and illustrated as such for the convenience of description. At least two units may be combined into a single unit providing an integrated function or a single unit may carry out its function being further divided into a plurality of sub-units. Embodiments realized by integration or division of individual units fall into the technical scope of the present invention unless the embodiments depart from the technical principles of the present invention.

Also, part of constituting elements may be optional elements for enhancing the functions and may be omitted.

The picture divider 105 may divide an input picture into at least one processing unit. The processing unit may be a prediction block (PB) or a transform block (TB), or a coding block (CB).

The picture divider 105 divides a single picture into a combination of a plurality of coding blocks, prediction blocks, and transform blocks. Based on a predetermined criterion (for example, a cost function), the picture divider 105 may encode a picture by choosing a single combination of coding blocks, prediction blocks, and transform blocks.

For example, a single picture may be divided into a plurality of coding blocks. To divide a picture by coding blocks, a recursive tree structure, such as quad tree structure, may be employed. By using a single picture or a maximum size coding block as a root, a coding block may be partitioned into other coding blocks, the coding block having as many child nodes as the number of partitioned coding blocks. A leaf node refers to a coding block which cannot be further partitioned according to predetermined conditions. If a single coding block allows division only into square regions, a single coding block can be divided into up to four different coding blocks.

Hereinafter, the term, coding block, may be used to indicate not only the unit of encoding but also the unit of decoding, that is, a decoding block.

A single coding block may be partitioned into one or more prediction blocks of the same size in the square or rectangular shape. Further, a single coding block may be partitioned into prediction blocks, the shape of one prediction block may be different from the shape of the remaining prediction blocks.

At the time of configuring prediction blocks for performing intra prediction based on coding blocks, if a prediction block does not correspond to the minimum coding block, intra prediction may be carried out without dividing the prediction block into a plurality of prediction blocks (N×N).

A predictor 110 may include an inter predictor, which carries out inter prediction, and an intra predictor, which carries out intra prediction. Whether to use inter prediction or intra prediction may be determined on the basis of prediction blocks and specific information (e.g., intra prediction mode, motion vector, reference picture, and so on) may be determined according to each prediction method. The processing unit by which prediction is carried out and the processing unit by which a prediction method and specific information are determined may differ from each other. For example, a prediction method and a prediction mode may be determined by prediction blocks and prediction may be carried out by transform blocks. A residual value (residual block) between a predicted block and the original block may be input to a transform unit 115. Also, prediction mode information used for prediction, motion vector information, and so on may be encoded together with residual values by the entropy encoding unit 130 and transferred to a decoder. In case of using a particular encoding mode, without generating a predicted block through the predictor 110, it may be possible to encode the original block as it is and transfer the encoded block to the decoder.

The inter predictor may perform inter prediction based on the information of at least one of previous and next pictures of a current picture. The inter predictor may include a reference picture interpolation unit, a motion predictor, and a motion compensation unit.

The reference picture interpolation unit may be provided with reference picture information from the memory 150 and may generate sub-integer accuracy pixel information for the reference picture. In case of luminance pixel, to generate sub-integer accuracy pixel information in units of 1/4 pixel, a DCT-based 8 tap interpolation filter with varying filter coefficients may be employed. In case of chrominance signal, to generate sub-integer accuracy pixel information in units of 1/8 pixel, a DCT-based 4 tap interpolation filter with varying filter coefficients may be employed.

The motion predictor may carry out estimation of motion based on reference pictures interpolated by the reference picture interpolation unit. As a method for estimating a motion vector, various methods, such as FBMA (Full search-based Block Matching Algorithm), TSS (Three Step Search), NTS (New Three-Step Search Algorithm), may be utilized. A motion vector may have a motion vector in units of 1/2 or 1/4 pixel based on interpolated pixels. The motion predictor may estimate a prediction block by applying various different methods for motion prediction. As a motion prediction method, various methods, such as skip method, merge method, AMVP (Advanced Motion Vector Prediction) method, may be utilized.

The intra predictor may generate a predicted block based on the information of reference pixels (i.e., reference samples) adjacent to a prediction block, which is the information about pixels of a current picture. If a reference pixel is the pixel which has performed inter prediction as the blocks adjacent to a prediction block have performed inter prediction, the reference pixels included in a block, which has performed inter prediction, may be substituted by reference pixel information of adjacent blocks which have performed intra prediction. If a reference pixel is not available, at least one reference pixel among available reference pixels may substitute for unavailable reference pixel information.

A prediction mode in intra prediction may be further divided into a directional prediction mode utilizing reference pixel information along a prediction direction and a non-directional prediction mode not utilizing directional information at the time of carrying out prediction. The mode for estimation of luminance information may be different from the mode for estimation of chrominance information, and intra prediction mode information estimating luminance information or predicted luminance signal information may be employed for predicting chrominance information.

In an intra prediction, if the size of a prediction block is the same as the size of a transform block, intra prediction may be carried out based on the pixels located at the left, upper-left, and upper sides of the prediction block. In the intra prediction, however, if the size of a prediction block is different from the size of a transform block, intra prediction may be carried out using reference pixels based on transform block. Also, an intra prediction, which applies N×N partition only for minimum prediction blocks, may be employed.

In accordance with a prediction mode, an intra prediction method may generate a predicted block after applying AIS (Adaptive Intra Smoothing) filter to reference pixels. Types of AIS filter to be applied for reference pixels may differ from each other. To carry out the intra prediction method, an intra prediction mode of a prediction block may be predicted from intra prediction modes of neighboring blocks adjacent to the prediction block. In case of predicting an intra prediction mode of a prediction block by using mode information predicted from neighboring blocks, if the intra prediction mode of the prediction block is the same as one of the intra prediction modes derived from the neighboring blocks, information indicating that the intra prediction mode of the prediction block is the same as one of the intra prediction modes derived from the neighboring blocks may be transferred by using predetermined flag information; if the intra prediction mode of the prediction block differ from all of the intra prediction modes derived from the neighboring blocks, the intra prediction mode of the prediction block may be encoded by carrying out entropy encoding.

The predictor, based on an encoding method using intra encoding mode described with respect to FIG. 3 through FIG. 8, may indicate intra prediction mode of a prediction block (i.e., current block) by using predetermined binary symbols, where a current block is a target block to be predicted.

Also, a residual block including residual information, which is the difference value between the prediction block and its predicted block generated at the predictor 110, may be generated. The residual block may be input to the transform unit 115. The transform unit 115 may transform the residual block including residual information of the predicted block generated by the predictor 110 and the prediction blocks by applying a transform method, such as DCT (Discrete Cosine Transform) or DST (Discrete Sine Transform). Whether to use the DCT or DST to transform the residual blocks may be determined based on intra prediction mode of a prediction block employed for generating the residual blocks.

The quantizer 120 may quantize the values transformed to the frequency region by the transform unit 115. Quantization coefficients may change according to block types or importance of the picture in question. The values calculated by the quantizer 120 may be provided to the inverse quantizer 135 and a re-alignment unit 125.

The re-alignment unit 125 may carry out re-alignment of coefficient values with respect to the quantized residual values.

The re-alignment unit 125 may change coefficients in the form of a two-dimensional (2D) block into a one-dimensional vector form by using a coefficient scanning method. For example, the re-alignment unit 125, by employing a zig-zag scanning method, may scan coefficients from DC to high frequency and modify them into a one-dimensional vector form. Depending on the size of a transform block and its intra prediction mode, a vertical scanning method, which scans coefficients forming a two-dimensional block along a column-wise direction, or a horizontal scanning method, which scans coefficients forming a two-dimensional block along a row-wise direction, may be applied rather than the zig-zag scanning method. In other words, depending on the size of a transform block and its intra prediction mode, a method from among the zig-zag scanning method, the vertical scanning method, and the horizontal scanning method may be determined.

The entropy encoding unit 130 may carry out entropy encoding based on the values calculated by the re-alignment unit 125. Entropy encoding, for example, may use various encoding methods, such as exponential Golomb, CAVLC (Context-Adaptive Variable Length Coding), and CABAC (Context-Adaptive Binary Arithmetic Coding).

The entropy encoding unit 130 receives various types of information, such as residual coefficient information of a block, block type information, prediction mode information, partitioning block information, prediction block information, transform block information, motion vector information, reference frame information, interpolation information of a block, filtering information, and so on, from the re-alignment unit 125 and the predictor 110 and encodes the information.

The entropy encoding unit 130 may apply entropy encoding to the coefficients of a block input from the re-alignment unit 125.

The entropy encoding unit 130 may store a table for carrying out entropy encoding, such as a variable length coding table, and carry out entropy encoding by using the table, such as the stored variable length coding table. In carrying out the entropy encoding, by applying a method of using a counter or direct swapping to a part of codewords included in the table, allocation of codewords for code number of the corresponding information may be modified. For example, for the case of a few of upper code numbers for which a small number of bits are allocated to codewords in the table mapping the code number to codewords, the mapping order of the table, which maps adaptively the codewords and code numbers, may be changed in such a way that a codeword of short length is assigned to the code number which reveals the largest accumulated number of occurrence counted by the counter. If the count approaches a predetermined threshold of the counter, the count recorded in the counter may be divided by half and counting may be started again.

For the code numbers in the table which are not involved in counting, if information corresponding to the code number occurs, the entropy encoding may be carried out by reducing the number of bits allocated to the corresponding code number by employing a direct swapping method which swaps positions with the code number at the immediate upper position.

The entropy encoding unit, based on an encoding method using intra encoding mode described with respect to FIG. 3 through FIG. 8, may indicate intra prediction mode of a prediction block by using predetermined binary symbols.

The inverse quantizer 135 and the inverse transform unit 140 inversely quantize the values quantized by the quantizer 120 and inversely transform the values transformed by the transform unit 115, respectively. Residuals generated at the inverse quantizer 135 and the inverse transform unit 140 may be used to generate reconstructed blocks. The residuals may be combined with predicted block predicted through the motion predictor and the motion compensation unit included in the predictor 110, and the intra predictor.

The filter unit 145 may include at least one of a deblocking filter, an offset compensation unit, and an ALF (Adaptive Loop Filter).

The deblocking filter 145 may remove block distortions caused from the boundary between blocks in a reconstructed picture. Whether to apply a deblocking filter to a block may be determined based on the number of columns included in the block or the number of pixel included in a row. In case of applying a deblocking filter to a block, according to the required filtering intensity of the deblocking filter, a strong or a weak filter may be employed.

Further, in carrying out vertical and horizontal filtering for the application of a deblocking filter, horizontal direction filtering and vertical direction filtering may be carried out in parallel.

The offset compensation unit may compensate the offset in units of pixels from the original image against the image for which the deblocking has been applied. To carry out offset compensation for a particular picture, a method of dividing pixels of the picture into a finite number of regions and determining a region for which to apply offset compensation and applying the offset compensation to the corresponding region or a method of applying offset compensation by taking account of edge information of each pixel may be employed.

The ALF (Adaptive Loop Filter) may perform filtering based on the values comparing a reconstructed picture after filtering and the original image. Pixels of the picture may be grouped into predetermined groups and filters may be assigned to the respective groups and filtering is carried out separately for each group. As for information about whether to apply ALF, luminance signals may be transferred for each coding block; and size and coefficients of an ALF to be applied for each block may vary. The ALF may have various forms and the number of coefficients included in the filter may also change. The filtering-related information of ALS above (e.g., filter coefficient information, ALF On/Off information, filter shape information) may be transferred after being included in a predetermined parameter set through a bit stream.

The memory 150 may store reconstructed blocks or picture calculated through the filter unit 145 and the reconstructed blocks or picture may be provided to the predictor 110 while carrying out the inter prediction.

Figure 2:
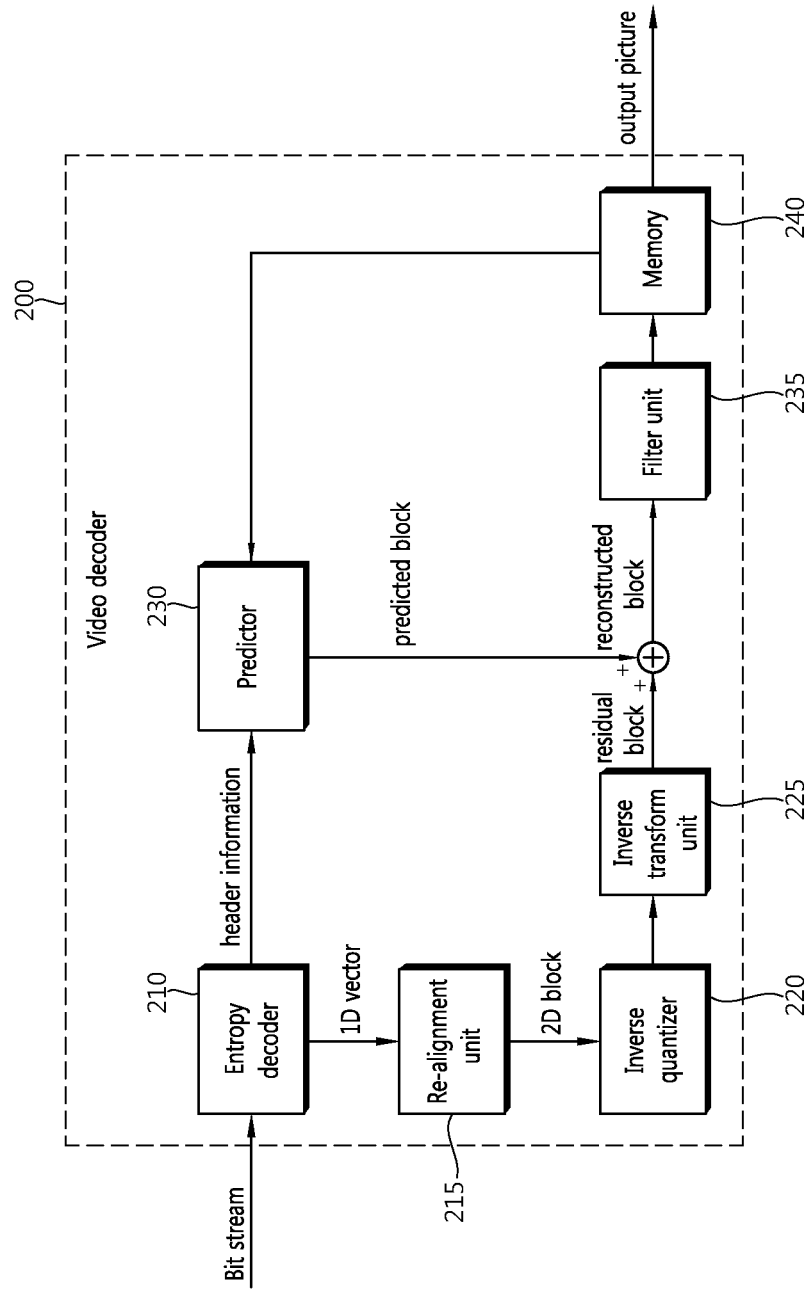
FIG. 2 is a block diagram of a video decoder according to an exemplary embodiment of the present invention.

FIG. 2 is a block diagram of a video decoder according to an exemplary embodiment of the present invention.

With reference to FIG. 2, the video decoder 200 may include an entropy decoder 210, a re-alignment unit 215, an inverse quantizer 220, an inverse transform unit 225, a predictor 230, a filter unit 235, and a memory 240.

When a video bit stream is input from a video encoder, the input bit stream may be decoded through an inverse order of the procedure carried out for the video encoder.

The entropy decoder 210 ("entropy decoding unit") may carry out entropy decoding through an inverse order of the procedure of entropy encoding carried out at the entropy encoder of a video encoder. For example, entropy decoding can be carried out as the VLC table used for carrying out entropy encoding at the video encoder is implemented to be the same variable length coding table at the entropy decoding unit. Information for generating a predicted block from among the information decoded at the entropy decoding unit 210 is provided to the predictor 230 and residual values with which the entropy decoding unit 210 has carried out entropy decoding may be provided to the re-alignment unit 215.

In the same manner as the entropy encoding unit 130 of FIG. 1, the entropy decoding unit 210 may also change the codeword allocation table by using a counter or a direct swapping method. Based on the changed codeword allocation table, entropy decoding may be carried out.

The entropy decoding unit 210 may decode information related to intra prediction and inter prediction performed at the encoder. As described above, if certain conditions, such as specific constraints for prediction, exist when the video encoder carries out intra and inter prediction, entropy decoding may be performed based on the conditions and information related to intra and inter prediction of a prediction block may be provided. The entropy decoding unit may carry out decoding operation described with respect to FIG. 3 through FIG. 8.

The entropy decoding unit 210, based on a decoding method of intra encoding mode described with respect to FIG. 3 through FIG. 8, may decode intra prediction mode information of a prediction block by using predetermined binary symbols.

The re-alignment unit 215 may re-align a bit stream entropy-decoded by the entropy decoder 210 based on the re-align method employed in the encoder 100. Coefficients expressed as a one-dimensional vector may be re-aligned by reconstructing the one-dimensional vector again into the coefficients of a two-dimensional block form. The re-alignment unit may receive information related to coefficient scanning performed at the encoder 100, may carry out re-alignment through a method of applying inverse scanning based on the scanning order performed at the encoder 100.

The inverse quantizer 220 may carry out inverse quantization based on quantization parameters provided by the encoder 100 and coefficient values of a re-aligned block.

The inverse transform unit 225 may apply inverse DCT or inverse DST, respectively, against the DCT or DST performed by the transform unit 115 on the quantization result performed at the video encoder 100. Inverse transform may be carried out based on a transform block determined at the video decoder. In the transform unit 115 of the video encoder 100, DCT or DST may be carried out selectively according to a prediction method, size and prediction direction, and so on, and the inverse transform unit 225 of the video decoder may carry out inverse transform based on the transform information carried out at the transform unit 115 of the video encoder 100.

In carrying out transformation, the transformation may be carried out based on a coding block rather than the transform block.

The predictor 230 may generate a predicted block based on the information related to generation of a predicted block provided by the entropy decoder 210 and information about a block or picture previously decoded provided by the memory 240.

As described above, if the size of a prediction block is the same as the size of a transform block when carrying out intra prediction in the same way as the operation at the video encoder 100, intra prediction may be carried out based on the pixels located at the left, upper-left, and upper side of the prediction block. However, if the size of the prediction block differs from the size of the transform block when carrying out intra prediction, intra prediction may be carried out using reference pixels based on the transform block. Also, intra prediction utilizing N×N partitioning may be used only for a minimum prediction block.

The predictor 230 may include a prediction block determination unit, an inter predictor, and an intra predictor. The prediction block determination unit may receive various pieces of information, such as prediction block information fed from the entropy decoding unit, prediction mode information of an intra prediction method, and motion prediction related information of an inter prediction method, identify prediction blocks from a current coding block, and determine whether the prediction block carries out inter prediction or intra prediction. The inter predictor may carry out inter prediction about a prediction block using information for inter prediction of a prediction block provided by the video encoder 100, based on the information of at least one of previous and next pictures of a current picture in which the prediction block is included.

To carry out inter prediction, it may be determined that, based on a coding block, which method among skip mode, merge mode, and AMVP mode a motion prediction method of a prediction block included in the corresponding coding block corresponds to.

The intra predictor may generate a predicted block based on pixel information within a current picture. If a prediction block is coded in intra prediction mode, intra prediction may be carried out based on intra prediction mode of the prediction block provided at the video encoder 100.

The intra prediction block may include an AIS filter, a reference pixel interpolation unit, a DC filter. The AIS filter applies filtering to reference pixels of a prediction block and it may be determined whether to apply the AIS filter based on a prediction mode of a prediction block. By using a prediction mode of a prediction block provided by the video encoder and AIS filter information, AIS filtering may be performed on the reference pixels of a prediction block. If the prediction mode of a prediction block corresponds to the mode that does not carry out AIS filtering, the AIS filter may not be applied.

The reference pixel interpolation unit, if the prediction mode of a prediction block corresponds to the prediction block carrying out intra prediction based on pixel values interpolating reference pixels, may interpolate reference pixels and generate reference pixels of sub-integer accuracy pixel units. If the prediction mode of a prediction block corresponds to the prediction mode generating a predicted block without interpolating reference pixels, the reference pixels may not be interpolated. The DC filter may generate a predicted block through filtering if the prediction mode of a prediction block is a DC mode.

A reconstructed block or picture may be provided to the filter unit 235. The filter unit 235 may include a deblocking filter, an offset compensation unit, and an ALF.

The video encoder 100 may provide information about whether the deblocking filter has been applied to the corresponding block or picture and information about whether a strong or weak filter has been applied if the deblocking filter is employed. The deblocking filter of the video decoder 200 may receive information related to the deblocking filter provided by the video encoder 100 and carry out deblocking filtering against the corresponding block at the video decoder 200. In the same way as the video encoder, vertical deblocking filtering and horizontal deblocking filter may be carried out. For those regions overlapping with each other, at least one of the vertical and horizontal deblocking filtering may be carried out. In the region where the vertical deblocking filtering and the horizontal deblocking filtering overlap, vertical deblocking filtering or horizontal deblocking filtering, which has not been carried out previously, may be carried out. Through the deblocking filtering procedure as described above, parallel processing of deblocking filtering may be performed.

The offset compensation unit may apply offset compensation on a reconstructed image based on the type of offset compensation applied to an image at the time of encoding, information about the offset value, and so on.

The ALF may perform filtering based on the values obtained by comparing a reconstructed picture after filtering with the original image. The ALF may be applied to a coding block based on the information about whether the ALF provided from an encoder has been applied, ALF coefficient information, and so on. The ALF information may be provided after being included in a particular parameter set.

The memory 240 may store a reconstructed picture or block so that the reconstructed picture or block can be used as a reference picture or reference block and may provide the reconstructed picture to an output unit.

As described above, although the embodiments of the present invention use the term of coding block for the convenience of description, the block may function as a unit for decoding as well as encoding. That is, the coding block may refer to a decoding block in a decoding process. A method of encoding and decoding an intra prediction mode by using a plurality of candidate intra prediction modes described with respect to FIG. 3 through FIG. 8 may be implemented to realize functions of each module described with respect to FIG. 1 and FIG. 2. The encoder and decoder described above are exemplary and do not limit the scope of the present invention.

Figure 3:
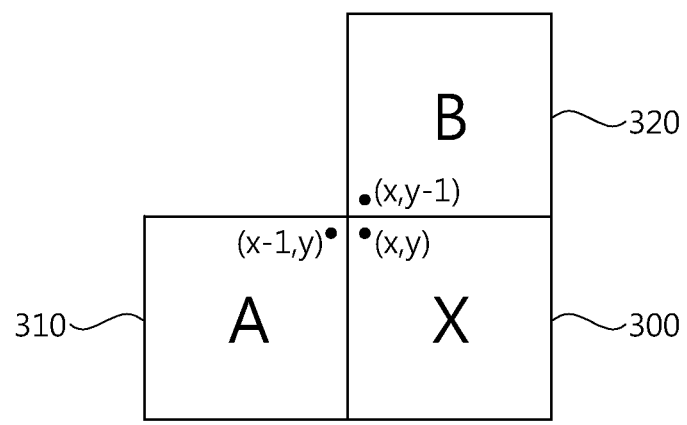
FIG. 3 is a conceptual diagram illustrating a method of encoding an intra prediction mode of a current block according to an exemplary embodiment of the present invention.

FIG. 3 is a conceptual diagram illustrating a method of encoding an intra prediction mode of a prediction block (i.e., current block) according to an exemplary embodiment of the present invention. A current block may refer to a target block to be predicted.

With reference to FIG. 3, an intra prediction mode of a current block 300 may be derived based on intra prediction modes of neighboring blocks 310, 320 of the current block.

According to aspects of the present invention, a block for deriving a candidate intra prediction mode used for predicting an intra prediction mode of a current block 300 may be defined as a neighboring block 310, 320. If the position of the upper-left pixel of a current block 300 is defined as (x, y), a first neighboring block 310 including a pixel position of (x−1, y) and a second neighboring block 320 including a pixel position of (x, y−1) may be defined to be neighboring blocks 310, 320.

A case where an intra prediction mode of a neighboring block is available may correspond to the case where a) a neighboring block exists; b) the neighboring block is coded in intra prediction mode; and c) an intra prediction mode can be derived from the neighboring block.

A case where an intra prediction mode of a neighboring block is unavailable may correspond to the case where a) no neighboring block exists; b) the neighboring block is not coded in intra prediction mode; or c) an intra prediction mode cannot be derived from the neighboring block.

Further, to predict an intra prediction mode of a current block 300, intra prediction modes of neighboring blocks 310, 320 and other sequential intra prediction modes may be used. The intra prediction mode of a current block 300 may be predicted by a candidate intra prediction mode, and a plurality of candidate intra prediction modes may be utilized.

According to aspects of the present invention, it may be assumed that three or four candidate intra prediction modes are used for convenience of description; however, five or more candidate intra prediction modes may be available.

If it is assumed that three or more candidate intra prediction modes are used to predict an intra prediction mode of a current block, an embodiment for deriving a candidate intra prediction mode to predict, encode, and decode an intra prediction mode of a current block may be implemented as described below.

1) If neighboring blocks of a current block are all available and have intra prediction modes different from each other (i.e., neighboring blocks have different intra prediction modes), two (i.e., a first and a second) candidate intra prediction modes may be derived from intra prediction modes of neighboring blocks. A third candidate intra prediction mode may be derived from an additional intra prediction mode different from two candidate intra prediction modes.

An additional intra prediction mode that is not derived from neighboring blocks may be referred to as a sequential, additional intra prediction mode. A sequential, additional intra prediction mode is an intra prediction mode used sequentially to derive a candidate intra prediction mode. In consideration of candidate intra prediction modes derived from neighboring blocks, a sequential, additional intra prediction mode may be set different from two candidate intra prediction modes derived from neighboring blocks as a third candidate intra prediction mode, so that three candidate intra prediction modes have different values from each other. Hereinafter, sequential, additional intra prediction modes will be described in detail.

2) If neighboring blocks of a current block are all available and have a same intra prediction mode, one candidate intra prediction mode may be derived from the same intra prediction mode of neighboring blocks. The remaining two candidate intra prediction modes may be derived from two additional other intra prediction modes (sequential, additional intra prediction modes) different from one candidate intra prediction mode derived from neighboring blocks, so that three candidate intra prediction modes have different values from each other.

3) If only one neighboring block is available from among neighboring blocks of a current block, one candidate intra prediction mode may be derived from intra prediction mode of neighboring block available. The remaining two candidate intra prediction modes may be derived from two additional other intra prediction modes (sequential, additional intra prediction modes) different from the candidate intra prediction mode derived from neighboring block available, so that three candidate intra prediction modes have different values from each other.

4) If neighboring blocks of a current block are not available at all, three candidate intra prediction modes may be derived by using sequential, additional intra prediction modes.

If an intra prediction mode of a current block is the same as a candidate intra prediction mode, information indicating whether an intra prediction mode of a current block 300 is the same as a candidate intra prediction mode may be encoded and decoded through predetermined flag information.

Hereinafter, various cases of deriving three or four candidate intra prediction modes for encoding and decoding intra prediction mode of a current block 300 will be described.

Case 1: A method of deriving candidate intra prediction modes when neighboring blocks of a current block are all available and have intra prediction modes different from each other (i.e., neighboring blocks have different intra prediction modes). That is, a first neighboring block 310 and a second neighboring block 320 exist around a current block 300; the first and second neighboring blocks 310 and 320 are coded in intra prediction mode; and intra prediction mode of the first neighboring block 310 differs from intra prediction mode of the second neighboring block 320.

In this case, a first candidate intra prediction mode may be set equal to an intra prediction mode which has the smallest value between intra prediction modes of the first 310 and the second neighboring block 320, and a second candidate intra prediction mode may be set equal to an intra prediction mode which has the largest value between intra prediction modes of the first 310 and the second neighboring block 320.

Alternatively, a first candidate intra prediction mode may be set to intra prediction mode of the first neighboring block 310 and a second candidate intra prediction mode may be set to intra prediction mode of the second neighboring block 320.

A method of encoding and decoding an intra prediction mode of a current block by using a plurality of candidate intra prediction modes may derive a plurality of candidate intra prediction modes by using sequential, additional candidate intra prediction mode(s) for encoding and decoding an intra prediction mode of a current block.

Three candidate intra prediction modes may be defined as a plurality of candidate intra prediction modes for encoding and decoding an intra prediction mode of a current block. In this case, for sequential, additional intra prediction mode(s), for example, a planar mode, a DC mode, and a vertical mode may be used, but aspects are not limited thereto.

An intra prediction mode used as a candidate intra prediction mode among sequential, additional intra prediction modes may be different from the candidate intra prediction modes derived from neighboring blocks.

For example, there may be a case that a first candidate intra prediction mode and a second candidate intra prediction mode can be derived from intra prediction modes of neighboring blocks 310 and 320, and none of the first and the second candidate intra prediction modes is the planar mode. In this case, a third candidate intra prediction mode may be set equal to the planar mode that is a first intra prediction mode among sequential, additional intra prediction modes.

If one of the first and the second candidate intra prediction modes derived from intra prediction modes of neighboring blocks is the planar mode and the other is not the DC mode, the third candidate intra prediction mode may be set equal to the DC mode that is a second intra prediction mode among sequential, additional intra prediction modes, since the planar mode already exists in the first or the second candidate intra prediction modes.

If one of the first and the second candidate intra prediction modes derived from intra prediction modes of neighboring blocks is the planar mode and the other is the DC mode, the third candidate intra prediction mode may be set equal to the vertical mode that is a third intra prediction mode among sequential, additional intra prediction modes, since the planar mode and the DC mode already exist in the first and second candidate intra prediction modes.

As described above, intra prediction mode of a current block may be predicted, encoded, and decoded by using three different candidate intra prediction modes.

Further, four candidate intra prediction modes may be used as a plurality of candidate intra prediction modes for encoding and decoding an intra prediction mode of a current block.

Sequential, additional intra prediction modes used for deriving four candidate intra prediction modes may be planar mode, DC mode, vertical mode, and horizontal mode.

For example, there may be a case in which a first candidate intra prediction mode and a second candidate intra prediction mode are derived from neighboring blocks, and the first and the second candidate intra prediction modes are not the planar mode or DC mode. In this case, among sequential, additional intra prediction modes, planar mode is derived as a third candidate intra prediction mode and DC mode as a fourth candidate intra prediction mode, which can be used for encoding and decoding intra prediction mode of a current block.

Also, it may be assumed that one of a first and second candidate intra prediction modes derived from neighboring blocks is planar mode and the other one is not DC mode. In this case, among sequential, additional intra prediction modes, DC mode is derived as a third candidate intra prediction mode while vertical mode is derived as a fourth candidate intra prediction mode in order not to make a candidate intra prediction mode identical to the candidate intra prediction modes derived from neighboring blocks.

If one of a first and second intra prediction modes derived from neighboring blocks is a planar mode, and the other is a DC mode (or DC mode and planar mode). In this case, a third candidate intra prediction mode is set to a vertical mode while a fourth candidate intra prediction mode as a horizontal mode in order not to make a candidate intra prediction mode identical to the candidate intra prediction modes derived from neighboring blocks.

The four candidate intra prediction modes derived through the method above can be used for predicting an intra prediction mode of a current block.

The order of sequential, additional intra prediction modes used for deriving three and four candidate intra prediction modes is introduced for an illustrative purpose and may be changed. For example, as another method for deriving three candidate intra prediction modes, sequential, additional intra prediction modes may employ planar mode, DC mode, and horizontal mode.

Further, as a still another method of using four candidate intra prediction modes, the sequential, additional intra prediction mode may use planar mode, DC mode, horizontal mode, and vertical mode sequentially as additional intra prediction modes.

If an intra prediction mode of a current block is predicted by using three candidate intra prediction modes, it may be assumed that planar mode, DC mode, and vertical mode are used sequentially as additional intra prediction modes.

If an intra prediction mode of a current block is predicted by using four candidate intra prediction modes, it may be assumed that planar mode, DC mode, vertical mode, and horizontal mode are used sequentially as additional intra prediction modes.

Case 2: A method of deriving candidate intra prediction modes when neighboring blocks of a current block are all available but have the same intra prediction mode.

Both the first neighboring block 310 and the second neighboring block 320 exist around a current block 300; the first 310 and the second neighboring block 320 may be coded in intra prediction mode, and intra prediction mode of the first neighboring block 310 is the same as intra prediction mode of the second neighboring block 320.

In this case, a first candidate intra prediction mode is set equal to the intra prediction mode of the first neighboring block 310, and the remaining candidate intra prediction modes are derived based on sequential, additional intra prediction mode(s).

For example, if three candidate intra prediction modes are used for predicting intra prediction mode of a current block 300, the remaining candidate intra prediction modes, the second and third candidate intra prediction modes, may be derived by using sequential, additional intra prediction mode(s).

For example, a first candidate intra prediction mode, which is an intra prediction mode of the first neighboring block 310, is not planar mode. In this case, an intra prediction mode different from the first candidate intra prediction mode among sequential, additional prediction modes may be used as a candidate intra prediction mode. Therefore, a second candidate intra prediction mode may be set equal to planar mode according to priority of order. A third candidate intra prediction mode may be set equal to vertical mode if the first candidate intra prediction mode is DC mode. Also, if the first candidate intra prediction mode is the remaining intra prediction mode different from planar and DC modes (in case it is neither planar nor DC mode), the third candidate intra prediction mode may be set equal to DC mode.

As another example, if a first candidate intra prediction mode, which is an intra prediction mode of the first neighboring block 310, is the planar mode, a second candidate intra prediction mode may be set equal to DC mode, and a third candidate intra prediction mode may be set equal to vertical mode.

If four candidate intra prediction modes are used for predicting a intra prediction mode of a current block 300, the second, third, and fourth candidate intra prediction modes may be configured in the same way as described above.

For example, if the first candidate intra prediction mode, which corresponds to the same intra prediction mode of the first 310 and second 320 neighboring blocks, is not the planar mode, the second candidate intra prediction mode can be set to the planar mode. Among the remaining sequential, additional intra prediction modes, DC mode, vertical mode, and horizontal mode, the remaining intra prediction modes different from the intra prediction mode that is the same as the first candidate intra prediction mode may be derived sequentially as the third candidate intra prediction mode and the fourth candidate intra prediction mode.

As another example, if a first candidate intra prediction mode, which corresponds to the same intra prediction mode of the first 310 and second 320 neighboring blocks, is the planar mode, the second candidate intra prediction mode may be set to DC mode; the third candidate intra prediction mode may be set to vertical mode; and the fourth candidate intra prediction mode may be set to horizontal mode.

Case 3: A method of deriving candidate intra prediction modes when only one neighboring block is available among neighboring blocks of a current block.

If only one neighboring block from a first 310 and a second 320 neighboring block is available, a candidate intra prediction mode may be derived only from the available neighboring block.

In this case, if three candidate intra prediction modes are used as a candidate intra prediction mode of a current block 300, the intra prediction mode calculated from the available neighboring block may be derived as a first candidate intra prediction mode. The remaining second and third candidate intra prediction modes may be derived based on sequential, additional intra prediction modes. That is, at least two intra prediction modes among planar mode, DC mode, and vertical mode which are sequential candidate intra prediction modes, may be derived sequentially as the second candidate intra prediction mode and the third candidate intra prediction mode, respectively.

For example, a first candidate intra prediction mode, which is an intra prediction mode of the available neighboring block, may be an intra prediction mode different from the planar mode. In this case, an intra prediction mode not identical to the first candidate intra prediction mode from among sequential additional prediction modes may be used as a candidate intra prediction mode. Therefore, a second candidate intra prediction mode may be configured as the planar mode. The remaining third candidate intra prediction mode may be configured as vertical mode if the first candidate intra prediction mode is DC mode to avoid plural assignment of DC mode as candidate prediction mode even though the DC mode has higher priority than the vertical mode. Also, if the first candidate intra prediction mode corresponds to the other intra prediction mode (in case it is neither planar nor DC mode), the third candidate intra prediction mode may be configured as the DC mode, which may have higher priority than other intra prediction modes except the planar mode.

As another example, if a first candidate intra prediction mode, which is an intra prediction mode of the available neighboring block, is the planar mode, a second candidate intra prediction mode is derived as the DC mode and a third candidate intra prediction mode is derived as vertical mode.

If four candidate intra prediction modes are used as candidate intra prediction modes of a current block 300, a second, third, and fourth candidate intra prediction modes may be configured in the same way as above.

For example, if a first candidate intra prediction mode, which is an intra prediction mode of the available neighboring block, is not the planar mode, a second candidate intra prediction mode may be configured as the planar mode. The remaining intra prediction modes different from an intra prediction mode of the first candidate intra prediction mode from among DC mode, vertical mode, and horizontal mode, which are the remaining sequential, additional intra prediction mode, may be derived sequentially as the third and the fourth candidate intra prediction mode.

Further, if a first candidate intra prediction mode, which is an intra prediction mode of the available neighboring block, is the planar mode, the second candidate intra prediction mode may be derived as the DC mode; the third candidate intra prediction mode may be derived as the vertical mode; and the fourth candidate intra prediction mode may be derived as the horizontal mode.

Case 4: A method of deriving candidate intra prediction modes when neighboring blocks of a current block are all unavailable.

Both a first neighboring block 310 and a second neighboring block 320 of a current block 300 may be unavailable.

It may be assumed that three candidate intra prediction modes are used for predicting an intra prediction mode of a current block 300 whose neighboring blocks are all unavailable.

If neighboring blocks are not available, as three candidate intra prediction modes for predicting an intra prediction mode of a current block, a first candidate intra prediction mode may be derived as the planar mode; a second candidate intra prediction mode may be derived as the DC mode; and a third candidate intra prediction mode may be derived as a vertical mode.

It may be assumed that four candidate intra prediction modes are used for predicting an intra prediction mode of a current block 300 whose neighboring blocks are all unavailable. In this case, as four candidate intra prediction modes for predicting an intra prediction mode of a current block, a first candidate intra prediction mode may be derived as the planar mode; a second candidate intra prediction mode may be derived as the DC mode; a third candidate intra prediction mode may be derived as the vertical mode; and a fourth candidate intra prediction mode may be derived as the horizontal mode.

Figure 4:
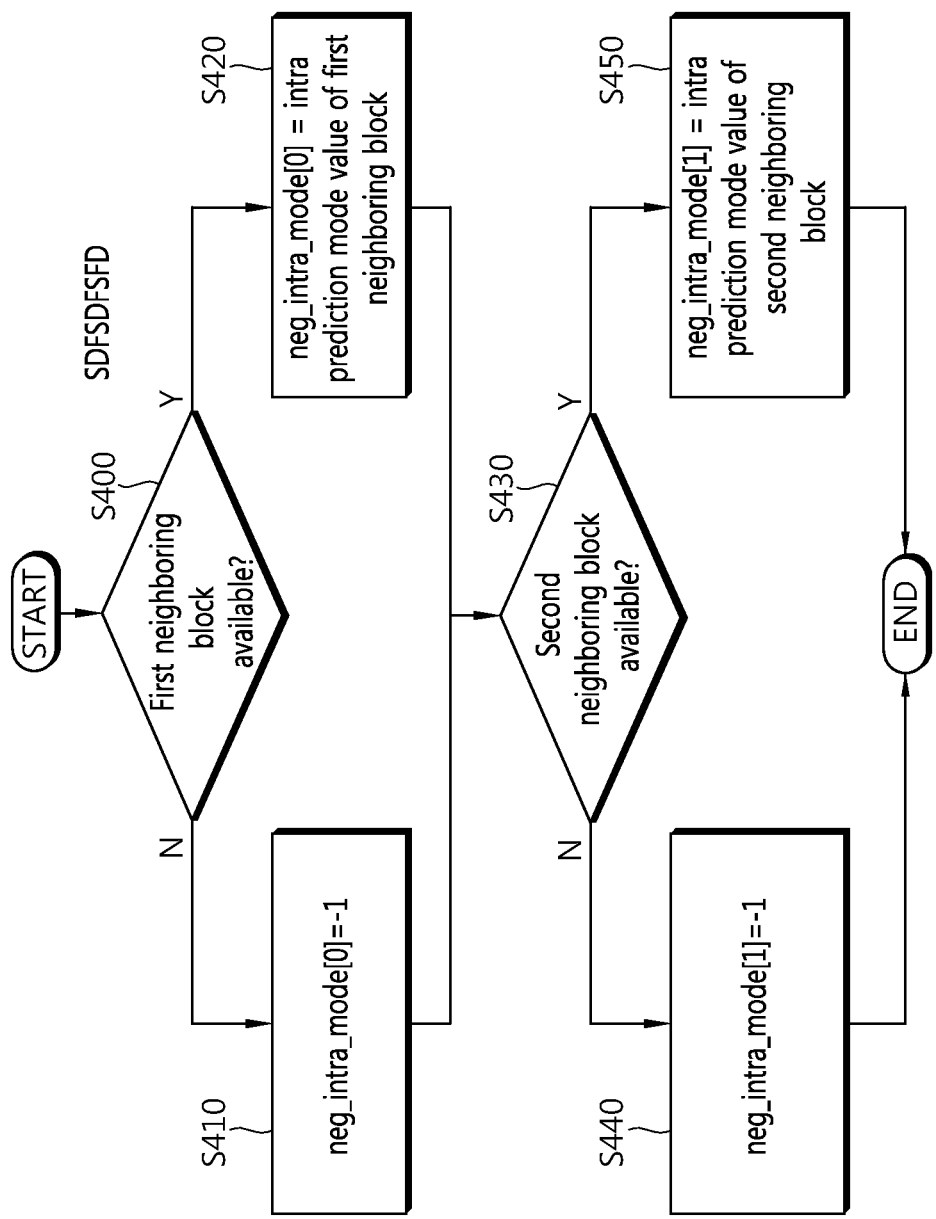
FIG. 4 is a conceptual diagram illustrating a method of determining availability of a neighboring block according to an exemplary embodiment of the present invention.

FIG. 4 is a conceptual diagram illustrating a method of determining availability of a neighboring block according to an exemplary embodiment of the present invention.

With reference to FIG. 4, it may be determined whether a first neighboring block is available in operation S400.

If a first neighboring block exists to the left side of a current block and the first neighboring block carries out prediction by using an intra prediction method, it is determined that the first neighboring block is available.

If the first neighboring block is not available, the intra prediction mode of the first neighboring block is configured to be −1 in operation S410.

By configuring the intra prediction mode of the first neighboring block as '−1', unavailability of the first neighboring block can be indicated. It is also possible to indicate availability of the first neighboring block by using a value different from '−1'.

The intra prediction mode of the first neighboring block may be expressed by using a predetermined syntax element. For example, the intra prediction mode of the first neighboring block may be expressed by using a syntax element neg_intra_mode[0]; if neg_intra_mode[0] is '−1', it indicates that the first neighboring block is not available.

If the first neighboring block is available, the intra prediction mode of the first neighboring block is used as the first candidate intra prediction mode in operation S420.

The intra prediction mode information of the first neighboring block may be expressed based on a syntax element neg_intra_mode[0]. The neg_intra_mode[0] in which the intra prediction mode of the first neighboring block is stored may be used as the first candidate intra prediction mode.

Intra prediction modes and intra prediction modes may be mapped as shown in Table 1.

TABLE 1

| Intra prediction mode | Associated names |
|---|---|
| 0 | Intra_Planar |
| 1 | Intra_Vertical |
| 2 | Intra_Horizontal |
| 3 | Intra_DC |
| Otherwise (4 . . . 34) | Intra_Angular |

With reference to Table 1, the planar mode (Intra_Planar) may be mapped to the intra prediction value of '0'; vertical mode (Intra_Vertical) to '1'; horizontal mode (Intra_Horizontal) to '2'; DC mode (Intra_DC) to '3'; and the other angular modes (Intra_Angular) may be mapped to 4 through 34. Further, the planar mode (Intra_Planar) may be mapped to a first value; the DC mode (Intra_DC) may be mapped to a second value; and angular modes (Intra_Angular) may be mapped to a plurality of values, which include the vertical mode (Intra_Vertical) and the horizontal mode (Intra_Horizontal). Since the vertical mode and the horizontal mode may be an angular mode set according to a specific angle, e.g., vertical and horizontal, respectively, the vertical mode (Intra_Vertical) and the horizontal mode (Intra_Horizontal) may be included in the angular modes (Intra_Angular).

According to aspects of the present invention, a smallest intra prediction mode number may be mapped to the planar mode and then, in the increasing order of intra prediction mode, vertical, horizontal, and DC mode can be mapped to an intra prediction mode, but aspects are not limited thereto.

In mapping an intra prediction mode, by mapping intra prediction modes based on the order of occurrence frequency of the intra prediction mode, which can be used at a current block, intra prediction mode information of a current block can be expressed with a smaller number of bits when carrying out binary encoding for transferring intra prediction mode information. Thus, a smaller number of bits may be mapped to an intra prediction mode having a higher occurrence frequency.

It may be determined whether a second neighboring block is available in operation S430.

If a second neighboring block exists to the left of a current block and the second neighboring block performs prediction based on an intra prediction mode, it is determined that the second neighboring block is available.

If the second neighboring block is unavailable, the intra prediction mode of the second neighboring block may be configured to be '−1' in operation S440.

By configuring the intra prediction mode of the second neighboring block as '−1', unavailability of the second neighboring block can be indicated. It is also possible to indicate availability of the second neighboring block by using a value different from '−1'.

The intra prediction mode of the second neighboring block may be expressed by using a syntax element neg_intra_mode[1]; if neg_intra_mode[1] is '−1', it indicates that the second neighboring block is not available.

If the second neighboring block is available, the intra prediction mode of the second neighboring block is used as the second candidate intra prediction mode in operation S450.

Based on the syntax element neg_intra_mode[1], the intra prediction mode of the second neighboring block can be represented. The intra prediction mode of the second neighboring block stored in the syntax element neg_intra_mode[1] can be configured as a second candidate intra prediction mode and thus can be used for predicting the intra prediction mode of a current block. For example, if two candidate intra prediction modes are derived from neighboring blocks, the intra prediction mode of a first neighboring block may be used for the first candidate intra prediction mode and the intra prediction mode of a second neighboring block may be used for the second candidate intra prediction mode.

In the following embodiments of the present invention, predetermined syntax elements may be defined by different variables or may be represented by being combined with different syntax element information within the technical principles of the present invention. Also, the values assigned to syntax elements may be arbitrary; the same information can be represented by different values.

Table 2 illustrates the number of intra prediction modes which are supported according to the size of a prediction block.

TABLE 2

| log2TrafoSize | intraPredModeNum |
|---|---|
| 2 (4 × 4) | 18 |
| 3 (8 × 8) | 35 |
| 4 (16 × 16) | 35 |
| 5 (32 × 32) | 35 |
| 6 (64 × 64) | 4 |

With reference to Table 2, if the size of a transform block is 4×4, as shown in the mapping of FIG. 1, 18 intra prediction modes ranging from 0 to 17 may be used. In cases of 8×8, 16×16, and 32×32 transform block, 35 intra prediction modes ranging from 0 to 34 may be used, and in case of 64×64, four intra prediction modes ranging from 0 to 3 may be used.

The size of a current block and the size of a neighboring block may differ from each other. Therefore, if the number of available prediction modes is different between the current block and the neighboring block, to obtain a first and a second candidate intra prediction mode for predicting the intra prediction mode of the current block, the first and the second candidate intra prediction modes have to be calculated by varying the intra prediction mode of the neighboring blocks based on the number of intra prediction modes available of the current block.

Figure 5:
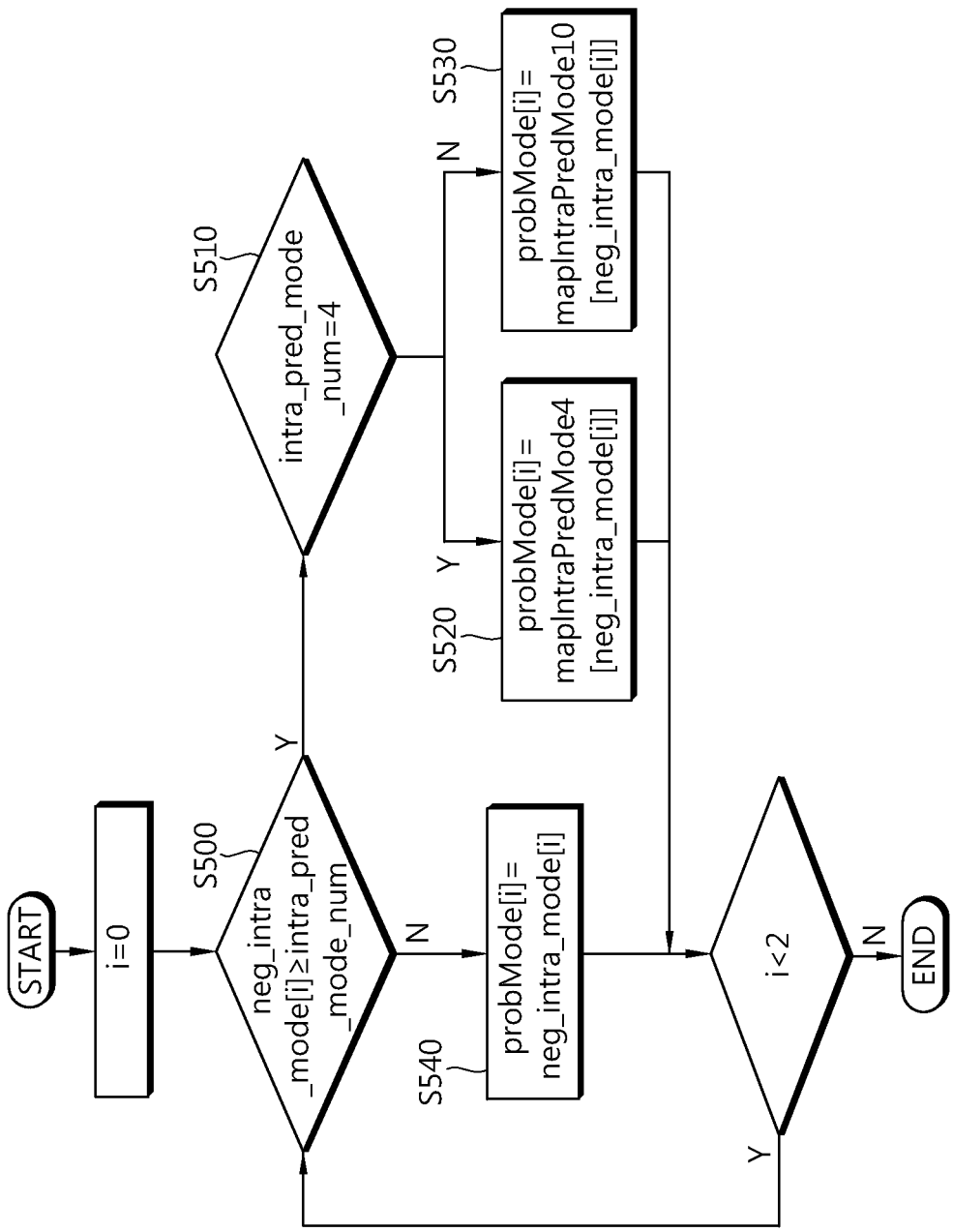
FIG. 5 is a flow diagram illustrating a method of changing an intra prediction mode of a neighboring block based on a current block according to an exemplary embodiment of the present invention.

FIG. 5 is a flow diagram illustrating a method of changing an intra prediction mode of a neighboring block based on a current block according to an exemplary embodiment of the present invention.

If the number of available intra prediction modes varies according to the size of a prediction block, an intra prediction mode used by a neighboring block may not be used as a candidate intra prediction mode used for predicting the intra prediction mode of a current block. In this case, a derived candidate intra prediction mode can be used after it is transformed to be fit for the size of the current block.

With reference to FIG. 5, it may be determined whether an intra prediction mode of a neighboring block is larger than or equal to the number of intra prediction modes available for the current block in operation S500.

Based on the determination of whether an intra prediction mode of a first neighboring block or an intra prediction mode of a second neighboring block is larger than or equal to the number of intra prediction modes available for the current block, it may be determined whether to change the intra prediction mode of the first neighboring block or the intra prediction mode of the second neighboring block.

The syntax element neg_intra_mode[i] may represent the intra prediction mode of a neighboring block and the syntax element intra_pred_mode_num may represent the number of intra prediction modes available for the current block.

If an intra prediction mode of a first neighboring block or an intra prediction mode of a second neighboring block is larger than or equal to the number of intra prediction modes available of the current block, it may be determined whether the number of intra prediction modes available of the current block is e.g., four in operation S510.

By determining the number of intra prediction modes available for the current block, the intra prediction mode of the first neighboring block or the intra prediction mode of the second neighboring block can be varied according to the intra prediction mode available for the current block.

In the operation S510, for the convenience of description, it may be determined whether the number of intra prediction modes available of the current block is four or not. If it is determined that the number of intra prediction modes available of the current block is four, the operation S520 may be performed. If it is determined that the number of intra prediction modes available of the current block is not four, it may be determined that the number of intra prediction modes available of the current block is 18 and the operation S530 may be performed. The intra prediction mode of the first or the second neighboring block can be varied based on the determination of whether the number of intra prediction modes available of the current block is 18.

If the number of intra prediction modes available of the current block is four, by using a mapping table, which maps the intra prediction mode of the first neighboring block or the intra prediction mode of the second neighboring block based on the intra prediction modes available of the current block, the intra prediction mode of the first neighboring block or the intra prediction mode of the second neighboring block can be varied.

Tables 3 and 4 below illustrate intra prediction mode mapping tables according to an exemplary embodiment of the present invention.

TABLE 3

|  | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| mapIntraPredMode4[ ] | 0 | 1 | 2 | 3 | 0 | 0 | 1 | 0 | 2 | 2 | 0 | 0 | 1 | 1 | 0 | 0 | 2 | 2 |
| mapIntraPredMode10[ ] | 0 | 1 | 2 | 3 | 4 | 5 | 6 | 7 | 8 | 9 | 0 | 0 | 0 | 0 | 0 | 0 | 0 | 0 |
|  | 18 | 19 | 20 | 21 | 22 | 23 | 24 | 25 | 26 | 27 | 28 | 29 | 30 | 31 | 32 | 33 | 34 |
| mapIntraPredMode4[ ] | 0 | 0 | 0 | 0 | 1 | 1 | 1 | 0 | 0 | 0 | 0 | 2 | 2 | 2 | 2 | 0 | 0 |
| mapIntraPredMode10[ ] | 0 | 4 | 5 | 5 | 1 | 1 | 6 | 6 | 7 | 4 | 8 | 8 | 2 | 2 | 9 | 9 | 0 |

TABLE 4

|  | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| mapIntraPredMode4[ ] | 0 | 1 | 2 | 3 | 3 | 3 | 1 | 3 | 2 | 2 | 3 | 3 | 1 | 1 | 3 | 3 | 2 | 2 |
| mapIntraPredMode10[ ] | 0 | 1 | 2 | 3 | 4 | 5 | 6 | 7 | 8 | 9 | 3 | 3 | 3 | 3 | 3 | 3 | 3 | 3 |
|  | 18 | 19 | 20 | 21 | 22 | 23 | 24 | 25 | 26 | 27 | 28 | 29 | 30 | 31 | 32 | 33 | 34 |
| mapIntraPredMode4[ ] | 3 | 3 | 3 | 3 | 1 | 1 | 1 | 3 | 3 | 3 | 3 | 2 | 2 | 2 | 2 | 3 | 3 |
| mapIntraPredMode10[ ] | 3 | 4 | 5 | 5 | 1 | 1 | 6 | 6 | 7 | 4 | 8 | 8 | 2 | 2 | 9 | 9 | 3 |

With reference to Tables 3 and 4, if the number of prediction modes available of the current block is four, by using the intra prediction mode calculated by the syntax element mapIntraPredMode4[ ], the intra prediction mode of the neighboring block can be converted into the prediction modes available for the current block.

Also, if the number of prediction modes available of the current block is 18, by using the intra prediction mode calculated by the syntax element mapIntraPredMode10[ ], the intra prediction mode of the neighboring block can be converted into the prediction modes available for the current block.

The intra prediction mode mapping table of Table 3 is an example of mapping table generated in such a way that many of the prediction modes available for the current block are mapped to 0 mode (planar mode), while the intra prediction mode mapping table of Table 4 is an example of mapping table generated in such a way that many of the prediction modes available of the current block are mapped to 4 mode (DC mode). In other words, if Table 3 is employed as the intra prediction mode mapping table, the intra prediction mode of the first neighboring block or the intra prediction mode of the second neighboring block unavailable for the current block are mapped, with a relatively large frequency, to the planar mode. Also, if Table 4 is employed as the intra prediction mode mapping table, the intra prediction mode of the first neighboring block or the intra prediction mode of the second neighboring block unavailable for the current block are mapped, with a relatively large frequency, to the DC mode.

Based on the intra prediction mode mapping table, the intra prediction mode of the first neighboring block or the intra prediction mode of the second neighboring block is changed to at least one of four prediction modes in operation S520.

Based on the intra prediction mode mapping table, the intra prediction mode of the first neighboring block or the intra prediction mode of the second neighboring block is changed to at least one of ten prediction modes in operation S530.

In the operations of S520 and S530, based on a predetermined intra prediction mapping table described in Table 3 and 4, respectively, an intra prediction mode of a neighboring block may be mapped into one of intra prediction modes available for a current block.

probMode[i] is a syntax element representing an intra prediction mode of a first neighboring block or an intra prediction mode of a second neighboring block, and can be used as information indicating a candidate intra prediction mode of a current block.

If the intra prediction mode of the first neighboring block or the intra prediction mode of the second neighboring block is smaller than the number of intra prediction modes available for a current block, the intra prediction mode of the first neighboring block or the intra prediction mode of the second neighboring block is directly used as information for predicting the intra prediction mode of the current block in operation S540.

If the intra prediction mode of the first neighboring block or the intra prediction mode of the second neighboring block is smaller than the number of intra prediction modes available for a current block, without changing the intra prediction mode of the first neighboring block or the intra prediction mode of the second neighboring block, the intra prediction mode of the first neighboring block or the intra prediction mode of the second neighboring block may be directly used as a candidate intra prediction mode.

Figure 6:
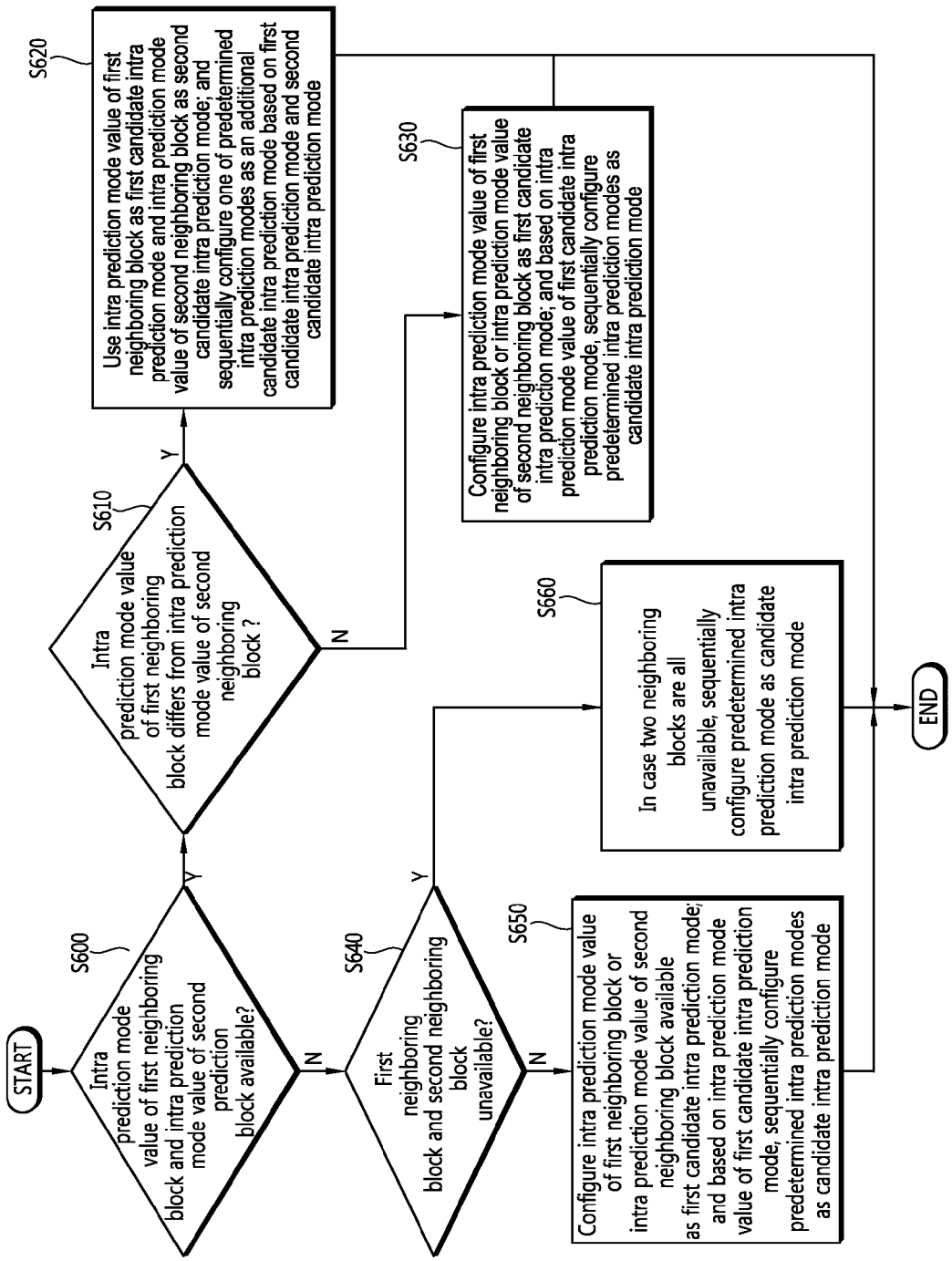
FIG. 6 is a flow diagram illustrating a method of generating a first candidate intra prediction mode and a second candidate intra prediction mode according to an exemplary embodiment of the present invention.

FIG. 6 is a flow diagram illustrating a method of deriving a first candidate intra prediction mode and a second candidate intra prediction mode according to an exemplary embodiment of the present invention.

With reference to FIG. 6, it may be determined whether an intra prediction mode of a first neighboring block and an intra prediction mode of a second neighboring block are available in operation S600.

Based on the procedure described with reference to FIG. 5 and based on the number of candidate intra prediction modes for a current block, it may be determined whether to convert the intra prediction mode of the first neighboring block or the intra prediction mode of the second neighboring block.

That is, in the operation S600, it may be determined whether the intra prediction mode of the first neighboring block or the intra prediction mode of the second neighboring block can be used as a first or a second candidate intra prediction mode. If any candidate intra prediction mode cannot be derived from the intra prediction mode(s) of the first and the second neighboring blocks, the first or the second candidate prediction mode may be set to at least one intra prediction mode from among sequential, additional intra prediction modes.

It may be determined whether an intra prediction mode of a first neighboring block differs from an intra prediction mode of a second neighboring block in operation S610.

If the intra prediction mode of the first neighboring block is not identical to the intra prediction mode of the second neighboring block, a first candidate intra prediction mode is set equal to the intra prediction mode of the first neighboring block, and a second candidate intra prediction mode is set equal to the intra prediction mode of the second neighboring block. Based on the first candidate intra prediction mode and the second candidate intra prediction mode, an additional candidate intra prediction mode may be derived from the sequential, additional intra prediction mode in operation S620.

As described above, if the first candidate intra prediction mode and the second candidate intra prediction mode can be derived from intra prediction modes of neighboring blocks and none of the first and the second candidate intra prediction modes is a planar mode, a third candidate intra prediction mode may be set equal to the planar mode as a candidate intra prediction mode of the current block.

If one of the first and the second candidate intra prediction modes is the planar mode, and the other is not a DC mode, the third candidate intra prediction mode may be set equal to the DC mode. Also, if one of the first and the second candidate intra prediction modes is the planar mode, and the other is the DC mode, the third candidate intra prediction mode may be set equal to a vertical mode.

As another example, four candidate intra prediction modes may be used as candidate intra prediction modes for a current block.

For example, a first candidate intra prediction mode and a second candidate intra prediction mode can be derived from neighboring blocks. If the first candidate intra prediction mode and the second candidate intra prediction mode are neither a planar mode nor a DC mode, a third candidate intra prediction mode may be derived into the planar mode and a fourth intra prediction mode may be derived into the DC mode.

As another example, if one of the first and second candidate intra prediction modes is the planar mode and the other is not a DC mode, the DC mode may be derived into the third candidate intra prediction mode and the vertical mode may be derived into the fourth candidate intra prediction mode.

Further, if the two of the first and second candidate intra prediction modes is the planar mode and the DC mode, respectively, the third candidate intra prediction mode may be set equal to a vertical mode and the fourth candidate intra prediction mode may be set equal to a horizontal mode.

If the intra prediction mode of the first neighboring block is identical to the intra prediction mode of the second neighboring block, the first candidate intra prediction mode is set equal to the intra prediction mode of the first neighboring block or the intra prediction mode of the second neighboring block. Based on the first candidate intra prediction mode, additional candidate intra prediction modes may be derived from sequential, additional intra prediction mode(s) in operation S630.

If the intra prediction mode of the first neighboring block is the same as the intra prediction mode of the second neighboring block, only the first candidate intra prediction mode may be set equal to the same intra prediction mode.

As described above, if only one candidate intra prediction mode may be derived from the same intra prediction mode of neighboring blocks, the remaining candidate intra prediction modes may be derived from sequential, additional intra prediction mode(s).

As described above, when carrying out intra mode prediction by using three candidate intra prediction modes, the first candidate intra prediction mode may be set equal to either the intra prediction mode of the first neighboring block or the intra prediction mode of the second neighboring block, where both intra prediction modes are the same.

If the first candidate intra prediction mode is not a planar mode, the second candidate intra prediction mode may be set equal to a planar mode and the third candidate intra prediction mode may be set equal to a DC mode. If the first candidate intra prediction mode is a planar mode, the second candidate intra prediction mode may be set equal to a DC mode and the third candidate intra prediction mode may be set equal to a vertical mode.

Similarly, in case of using four candidate intra prediction modes, if the first candidate intra prediction mode is not a planar mode, the second candidate intra prediction mode may be set equal to a planar mode. If the first candidate intra prediction mode is not a planar mode, the third and the fourth candidate intra prediction modes may be determined as follows.

1) It may be determined whether the first candidate intra prediction mode is a DC mode, a vertical mode, or a horizontal mode and, if the first candidate intra prediction mode is not the DC mode, the vertical mode, or the horizontal mode, the third candidate intra prediction mode may be set equal to the DC mode and the fourth candidate intra prediction mode may be set equal to a vertical mode.

2) It may be determined whether the first candidate intra prediction mode is a DC mode, a vertical mode, or a horizontal mode and the first candidate intra prediction mode may be the same as one intra prediction mode among the DC mode, the vertical mode, or the horizontal mode. In this case, the remaining intra prediction mode different from the same intra prediction mode may be derived sequentially into the third candidate intra prediction mode and then the fourth candidate intra prediction mode.

It may be determined whether all of the first and the second neighboring blocks are unavailable in operation S640.

If only one neighboring block from the first and the second neighboring blocks is available, the intra prediction mode of the available neighboring block from the first neighboring block or the second neighboring block is derived into the first candidate intra prediction mode and, by using the intra prediction mode of the first candidate intra prediction mode, the intra prediction mode of the first or second neighboring block available may be derived into a candidate intra prediction mode based on predetermined intra prediction modes in operation S650.

Similar to the operation S630, if only one neighboring block from the first and the second neighboring blocks is available, the intra prediction mode of the available neighboring block may be derived into the first candidate intra prediction mode.

By carrying out the same procedure as described in the operation S630, the remaining candidate intra prediction modes may be configured to be three candidate intra prediction modes or four candidate intra prediction modes.

If the two neighboring prediction modes are all unavailable, by using sequential, additional intra prediction mode, the candidate intra prediction mode may be derived in operation S660.

For example, if three candidate intra prediction modes are used for predicting the intra prediction mode of a current block, the first candidate intra prediction mode may be derived into a planar mode; the second candidate intra prediction mode may be derived into a DC mode; and the third candidate intra prediction mode may be derived into a vertical mode. As another example, if four candidate intra prediction modes are used to predict the intra prediction mode of the current block, the first candidate intra prediction mode may be derived into a planar mode; the second candidate intra prediction mode may be derived into a DC mode; the third candidate intra prediction mode may be derived into a vertical mode; and the fourth candidate intra prediction mode may be derived into a horizontal mode.

Figure 7:
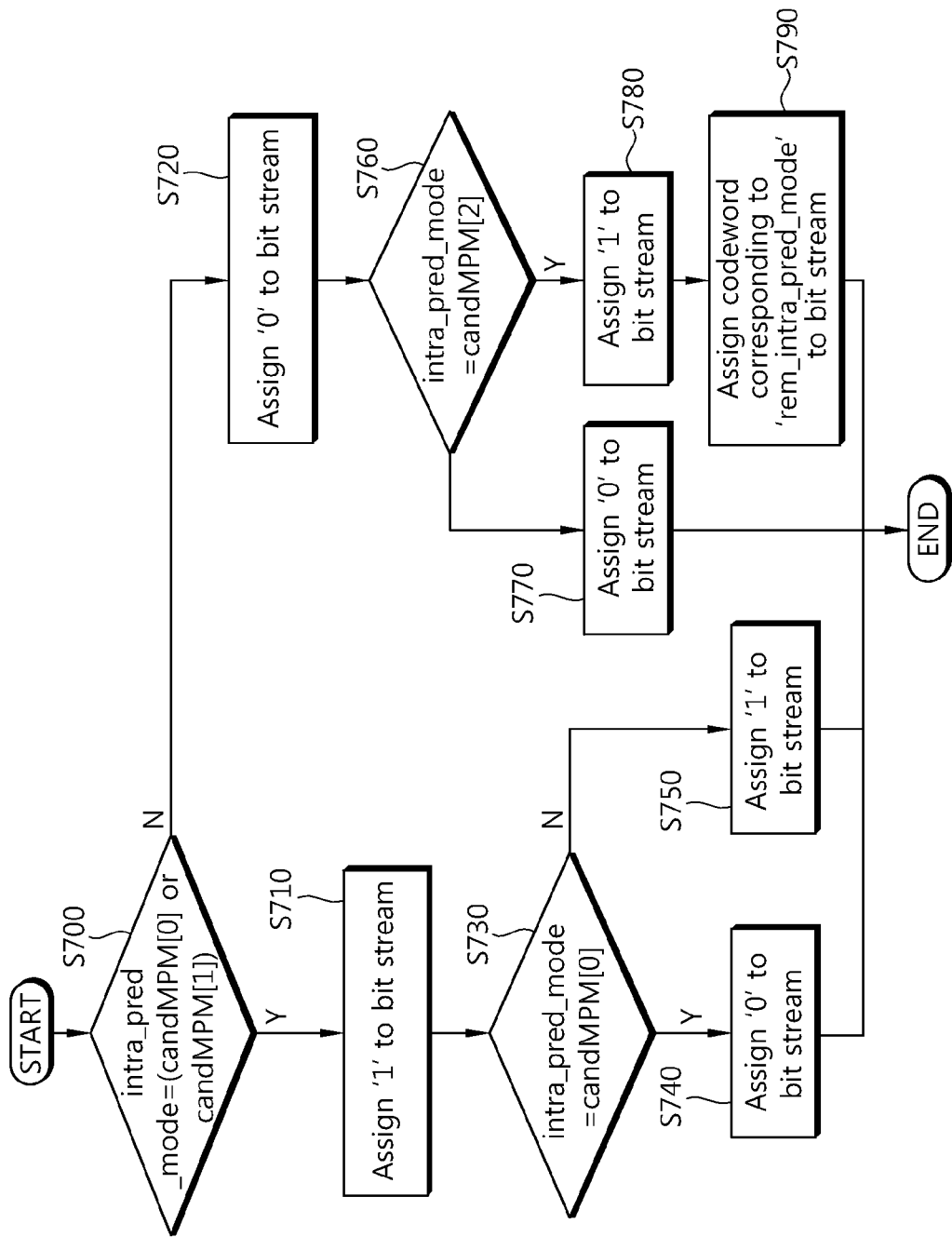
FIG. 7 is a flow diagram illustrating a method of mapping information about an intra prediction mode of a current block into a codeword according to an exemplary embodiment of the present invention.

FIG. 7 is a flow diagram illustrating a method of mapping information about an intra prediction mode of a current block into a codeword according to an exemplary embodiment of the present invention.

FIG. 7 is a flow diagram intended for the case where three candidate intra prediction modes are used for predicting the intra prediction mode for a current block.

With reference to FIG. 7, it may be determined whether the intra prediction mode of a current block is the same as a first candidate intra prediction mode or a second candidate intra prediction mode in operation S700.

If the intra prediction mode of a current block is the same as the first candidate intra prediction mode or the second candidate intra prediction mode, 1 may be assigned to a codeword in operation S710, whereas, if the intra prediction mode of a current block is not the same as the first candidate intra prediction mode and the intra prediction mode of the current block is not the same as the second candidate intra prediction mode, 0 may be assigned to a codeword in operation S720.

It may be determined whether the intra prediction mode of a current block is the same as the first candidate intra prediction mode in operation S730; if it is found to be identical to each other, 0 may be additionally assigned to the codeword in operation S740. If it is found to be different, 1 may be additionally assigned to the codeword in operation S750.

It may be determined whether the intra prediction mode of a current block is the same as the third candidate intra prediction mode in operation S760.

If it is determined that the intra prediction mode of a current block is the same as the third candidate intra prediction mode, 0 may be additionally assigned to the codeword in operation S770.

If it is determined that the intra prediction mode of a current block is not the same as the third candidate intra prediction mode, 1 may be additionally assigned to the codeword in operation S780.

If it is determined that the intra prediction mode of a current block is not the same as the third candidate intra prediction mode, a codeword corresponding to the remaining intra prediction mode information may be assigned in operation S790.

To indicate the intra prediction mode of the current block, the remaining prediction mode information may be mapped to the codeword and a codeword corresponding to the intra prediction mode, which corresponds to the intra prediction mode of the current block, can be allocated. The codeword corresponding to the intra prediction mode, which corresponds to the intra prediction mode of the current block, may be encoded and decoded based on a syntax element rem_intra_pred_mode (hereinafter, the remaining intra prediction mode is used as the term of the same meaning as rem_intra_pred_mode).

Table 5 illustrates mapping between the intra prediction mode of a current block and the codeword according to the procedure described above.

TABLE 5

| Codeword | Current mode (intra_pred_mode) |
| --- | --- |
| 10 | candMPM[0] |
| 11 | candMPM[1] |
| 00 | candMPM[2] |
| 01 + rem | rem_intra_pred_mode |

With reference to Table 5, if the intra prediction mode of a current block is identical to a first candidate intra prediction mode, a second candidate intra prediction mode, or a third candidate intra prediction mode, the intra prediction mode of the current block can be expressed by using two bits of codeword.

In case the intra prediction mode of a current block is different from the first candidate intra prediction mode, the second candidate intra prediction mode, and the third candidate intra prediction mode, the intra prediction mode of the current block may be indicated based on the two bits of codeword to which a bit value assigned to rem_intra_pred_mode is added.

The codeword assigned to rem_intra_pred_mode, which corresponds to the remaining intra prediction mode, may vary. The codeword assigned to the remaining intra prediction mode is generated by comparing the intra prediction mode of the current block with the first candidate intra prediction mode, the second candidate intra prediction mode, and the third candidate intra prediction mode.

In the encoding stage, the remaining intra prediction mode may be assigned as a new codeword. The intra prediction mode of the current block may be compared with the first candidate intra prediction mode, the second candidate intra prediction mode, and the third candidate intra prediction mode. It may be determined whether the prediction mode of the current block is larger than the first candidate intra prediction mode, the second candidate intra prediction mode, and the third candidate intra prediction mode. If it is determined that one of the first candidate intra prediction mode, the second candidate intra prediction mode, and the third candidate intra prediction mode is larger than the prediction mode of the current block, the mapping relationship between the intra prediction mode of the current block and the codeword may change. In other words, the intra prediction mode of a current block encoded based on the remaining intra prediction mode (rem_intra_pred_mode) may correspond to the value calculated as a result of comparing the intra prediction mode of a current block with the first candidate intra prediction mode, the second candidate intra prediction mode, and the third candidate intra prediction mode.

In other words, if the intra prediction mode of a current block is different from the first candidate intra prediction mode, the second candidate intra prediction mode, and the third candidate intra prediction mode, based on additional syntax element information including the intra prediction mode of the current block, the intra prediction mode of the current block may be derived.

Also, there can be changed the intra prediction mode derived by comparing the intra prediction mode derived by decoding information representing the same intra prediction mode as the intra prediction mode of the current block with the first candidate intra prediction mode, the second candidate intra prediction mode, and the third candidate intra prediction mode.

In a method of determining intra prediction mode information, if a current block of 64×64 size is employed, the codeword in accordance with the intra prediction mode of a current block may be mapped as illustrated in Table 6.

TABLE 6

| Code words | Current mode (intra_pred_mode) |
| --- | --- |
| 00 | Planar |
| 01 | Ver |
| 10 | Hor |
| 11 | DC |

With reference to Table 6, since the available intra prediction modes are four when a current block of 64×64 size is employed, the intra prediction mode information of the current block may be represented with fixed two bits without employing a process of determining whether the intra prediction mode of the current block is the same as the first candidate intra prediction mode and the second candidate intra prediction mode.

Although, for the convenience of description, FIG. 7 illustrates the case where three candidate intra prediction modes are used, the intra prediction mode of a current block can be expressed based on three or more candidate intra prediction modes.

Table 7, Table 8, and Table 9 illustrate the codeword and the current candidate intra prediction mode when four candidate intra prediction modes are used.

TABLE 7

| Codeword | Current mode (intra_pred_mode) |
| --- | --- |
| 10 | candMPM[0] |
| 11 | candMPM[1] |
| 00 | candMPM[2] |
| 010 | candMPM[3] |
| 011 + rem | rem_intra_pred_mode |

TABLE 8

| Codeword | Current mode (intra_pred_mode) |
| --- | --- |
| 10 | candMPM[0] |
| 11 | candMPM[1] |
| 000 | candMPM[2] |
| 001 | candMPM[3] |
| 01 + rem | rem_intra_pred_mode |

TABLE 9

| CODEWORD | CURRENT MODE |
| --- | --- |
| 10 | MPM1 |
| 11 | MPM2 |
| 010 | MPM3 |
| 011 | MPM4 |
| 00 + rem | rem |

The syntax is not limited to its calling convention, and the syntax may vary within the technical principles of the present invention. For example, for the convenience of description or technology, candMPM[0] can be denoted by MPM1; candMPM[1], by MPM2; candMPM[2], by MPM3; and candMPM[3], by MPM4; and rem_intra_pred_mode can be expressed simply by rem.

Figure 8:
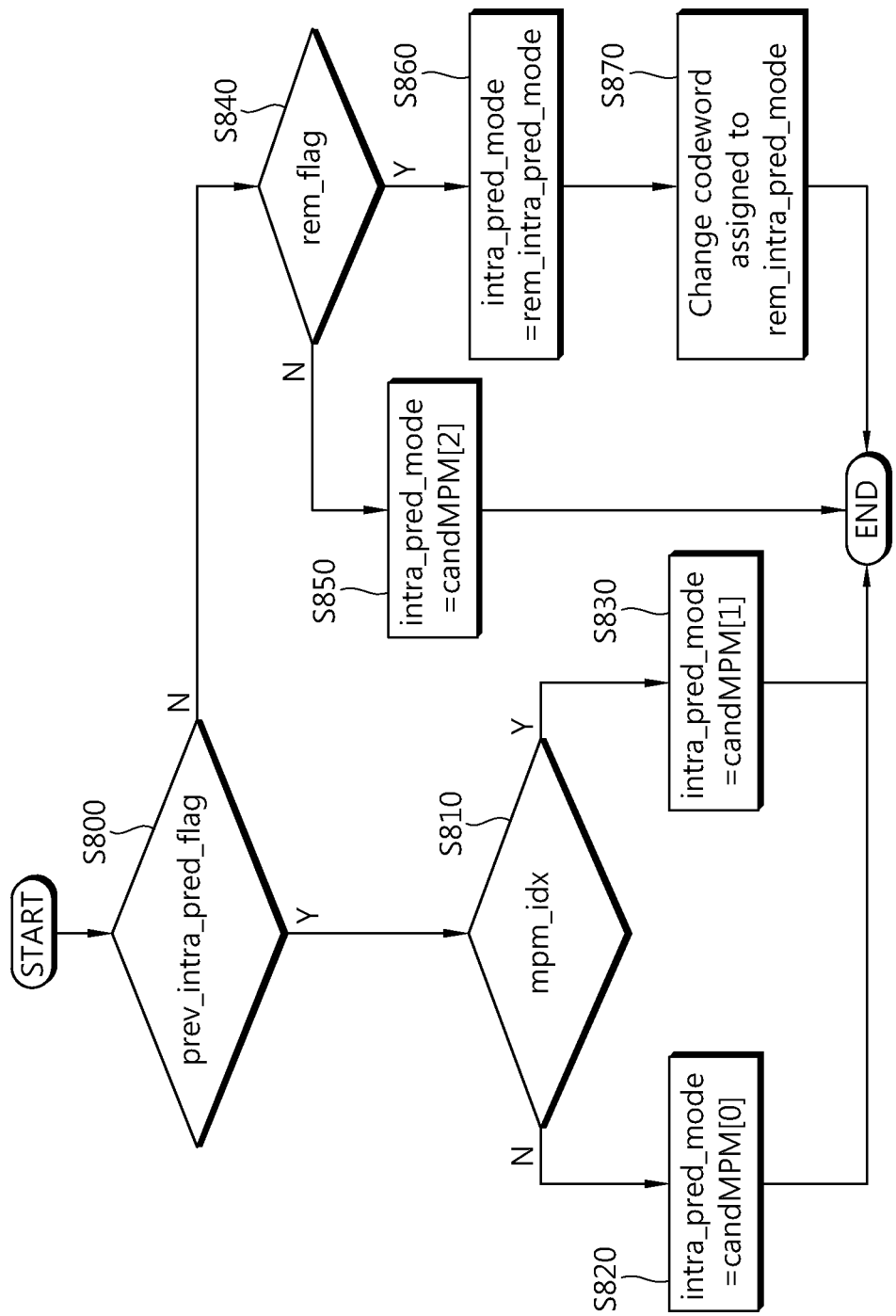
FIG. 8 is a flow diagram illustrating a method of decoding a current intra prediction mode according to an exemplary embodiment of the present invention.

FIG. 8 is a flow diagram illustrating a method of decoding a current intra prediction mode according to an exemplary embodiment of the present invention.

With reference to FIG. 8, it may be determined whether the intra prediction mode of a current block is the same as a first candidate intra prediction mode or a second candidate intra prediction mode in operation S800.

In order to determine whether the intra prediction mode of a current block is the same as the first candidate intra prediction mode or the second candidate intra prediction mode, prev_intra_pred_flag may be used, which is the flag information indicating whether the intra prediction mode of the current block is the same as the first candidate intra prediction mode or the second candidate intra prediction mode.

For example, if prev_intra_pred_flag is 1, it indicates that the intra prediction mode of the current block is the same as the first candidate intra prediction mode or the second candidate intra prediction mode; if prev_intra_pred_flag is 0, it indicates that the intra prediction mode of the current block is different from the first candidate intra prediction mode or the second candidate intra prediction mode.

In case prev_intra_pred_flag is 1, by using an index mpm_idx, which indicates whether the intra prediction mode of the current block is the same as the first candidate intra prediction mode or the second candidate intra prediction mode, the intra prediction mode of the current block can be expressed.

mpm_idx is checked in operation S810 and, if mpm_idex is 0, the intra prediction mode of the current block may be determined to be the first candidate intra prediction mode in operation S820. If mpm_idex is 1, the intra prediction mode of the current block may be determined to be the second candidate intra prediction mode in operation S830.

If prev_intra_pred_flag is 0, based on predetermined flag information additionally indicating whether an intra prediction mode of a current block corresponds to the remaining intra prediction mode, the intra prediction mode of the current block may be calculated in operation S840.

In case prev_intra_pred_flag is 0, based on predetermined flag information (rem_flag) additionally indicating whether an intra prediction mode of a current block corresponds to the remaining intra prediction mode, if rem_flag is 0, the intra prediction mode of the current block is the same as the third candidate intra prediction mode in operation S850. If rem_flag is 1, the intra prediction mode of the current block is the same as the remaining intra prediction mode in operation S860.

In other words, in the decoding stage, the codeword described in Table 5 is received and, based on the codeword received, the intra prediction mode of the current block may be decoded.

The codeword assigned to rem_intra_pred_mode may be changed in operation S870.

In the decoding stage, in the same manner to the encoding stage, the remaining intra prediction mode may be assigned as a new codeword. The intra prediction mode of the current block may be compared with the first candidate intra prediction mode, the second candidate intra prediction mode, and the third candidate intra prediction mode. It may be determined whether the prediction mode of the current block is larger than the first candidate intra prediction mode, the second candidate intra prediction mode, and the third candidate intra prediction mode. If it is determined that one of the first candidate intra prediction mode, the second candidate intra prediction mode, and the third candidate intra prediction mode is larger than the prediction mode of the current block, the mapping relationship between the intra prediction mode of the current block and the codeword may change. In other words, the intra prediction mode of a current block calculated based on the remaining intra prediction mode (rem_intra_pred_mode) may correspond to the value calculated as a result of comparing the remaining intra prediction mode with the first candidate intra prediction mode, the second candidate intra prediction mode, and the third candidate intra prediction mode.

In a method of determining an intra prediction mode information according to an embodiment of the present invention, if the transform block of 64×64 size is employed and the intra prediction mode of a current block and the codeword are mapped as shown in FIG. 6, the intra prediction mode information of the current block may be represented with fixed two bits without employing a process of determining whether the intra prediction mode of the current block is the same as the first candidate intra prediction mode and the second candidate intra prediction mode.

In other words, according to an embodiment of the present invention, information indicating whether an intra prediction mode of a current block is the same as one of the first candidate intra prediction mode, the second candidate intra prediction mode, and the third candidate intra prediction mode can be decoded.

If the intra prediction mode of a current block is the same as one of the first candidate intra prediction mode, the second candidate intra prediction mode, and the third candidate intra prediction mode, the candidate intra prediction mode identical to the intra prediction mode of the current block may be derived and, based on the same candidate intra prediction mode, intra prediction about the current block may be carried out.

Meanwhile, in the description of FIG. 8, if prev_intra_pred_flag is 1, it indicates that the intra prediction mode of the current block is the same as the first candidate intra prediction mode or the second candidate intra prediction mode and performs operation S810. If prev_intra_pred_flag is 0, it indicates that the intra prediction mode of the current block is different from the first candidate intra prediction mode and the second candidate intra prediction mode and performs the operation S840.

However, indication of a flag described in exemplary embodiments of the present invention is determined only for the convenience of description and thus, a logical value of the corresponding flag or the value indicated by the flag is not limited to a particular value. For example, prev_intra_pred_flag 0 may indicate that the intra prediction mode of the current block is the same as the first candidate intra prediction mode or the second candidate intra prediction mode, and prev_intra_pred_flag 1 may indicate that the intra prediction mode of the current block is different from the first candidate intra prediction mode and the second candidate intra prediction mode. Similarly, as described above, it can be configured such that if rem_flag is 1, the intra prediction mode of the current block may be the same as the remaining intra prediction mode; if rem_flag is 0, the intra prediction mode of the current block may be the same as the third candidate intra prediction mode; if rem_flag is 0, the intra prediction mode of the current block may be the same as the remaining intra prediction mode; and if rem_flag is 1, the intra prediction mode of the current block may be the same as the third candidate intra prediction mode. If the flag value is changed, the flag at each step may indicate what is applied to a current block regarding the information to be identified at the corresponding step.

FIG. 9 through FIG. 13 are flow diagrams illustrating a case where three or four candidate intra prediction modes are used for a method of determining a candidate intra prediction mode by using a plurality of candidate intra prediction modes according to another embodiment of the present invention.

In describing a predetermined determination procedure of a flow diagram to be described below, a sequential procedure to be described is determined in a random order for the convenience of description; therefore, unless otherwise departing from the scope of the present invention, a determination procedure in a different order from the procedural order described below may be used to determine a candidate intra prediction mode.

Figure 9:
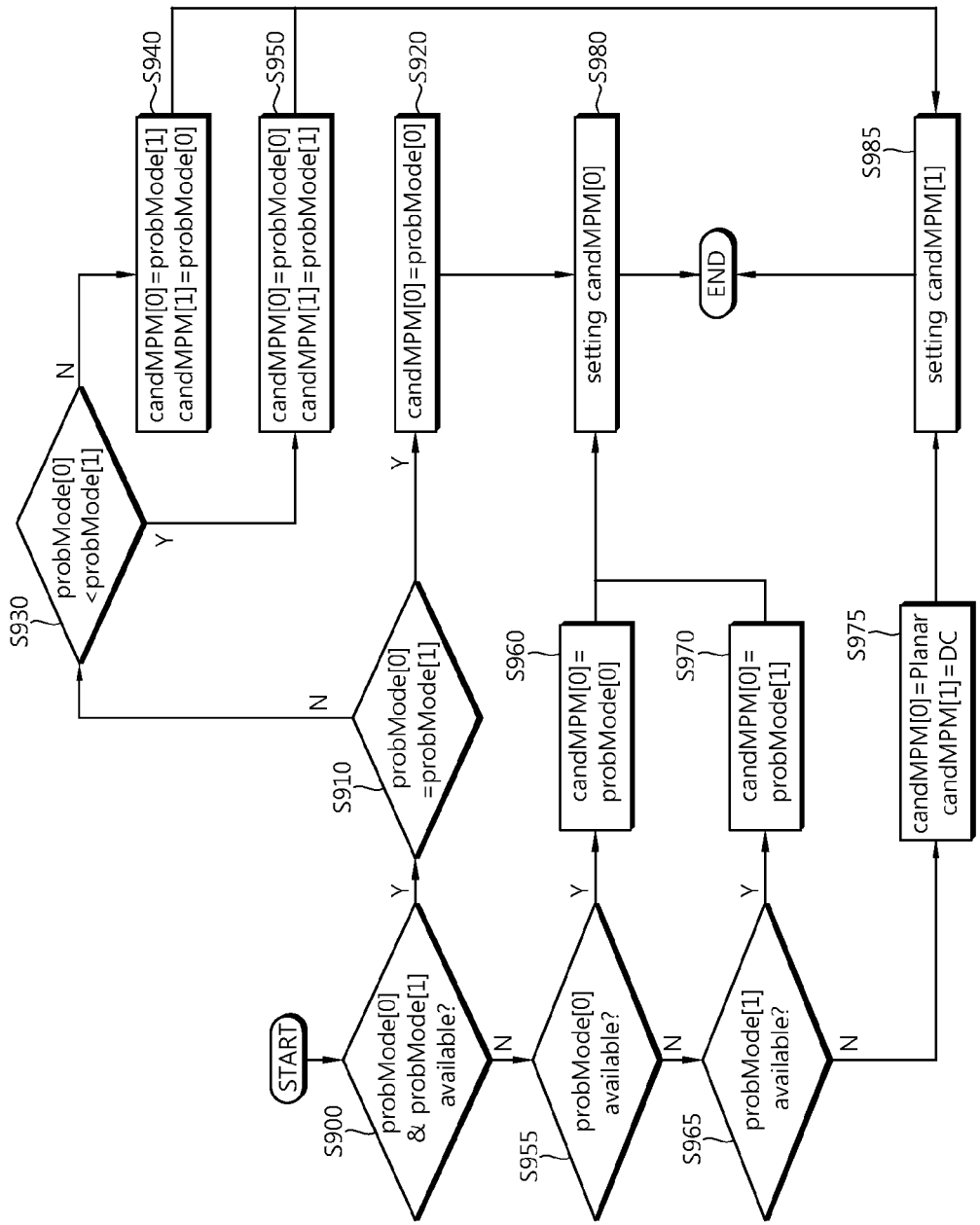
FIG. 9 is a flow diagram illustrating a method of configuring a candidate intra prediction mode available from a neighboring block according to an exemplary embodiment of the present invention.

FIG. 9 is a flow diagram illustrating a method of configuring a candidate intra prediction mode available from a neighboring block according to an embodiment of the present invention.

With reference to FIG. 9, it is determined whether an intra prediction mode of a first neighboring block and an intra prediction mode of a second neighboring block are available S900.

In case an intra prediction mode of a first neighboring block and an intra prediction mode of a second neighboring block are available and the intra prediction mode can be derived for each of the neighboring blocks, it is determined whether the intra prediction mode of the first neighboring block and the intra prediction mode of the second neighboring block are the same to each other S910.

In case the intra prediction mode of the first neighboring block and the intra prediction mode of the second neighboring block are available and the intra prediction mode of the first neighboring block and the intra prediction mode of the second neighboring block are the same to each other, the same intra prediction mode is derived as the first candidate intra prediction mode S920.

It is determined whether the intra prediction mode of the first neighboring block is smaller than the intra prediction mode of the second neighboring block S930.

In case the intra prediction mode of the first neighboring block is larger than the intra prediction mode of the second neighboring block, the intra prediction mode of the second neighboring block is derived into the first candidate intra prediction mode while the intra prediction mode of the first neighboring block is derived into the second candidate intra prediction mode S940.

In case the intra prediction mode of the first neighboring block is smaller than the intra prediction mode of the second neighboring block, the intra prediction mode of the first neighboring block is derived into the first candidate intra prediction mode while the intra prediction mode of the second neighboring block is derived into the second candidate intra prediction mode S950.

It is determined whether only the intra prediction mode of the first neighboring block is available S955; in case only the intra prediction mode of the first neighboring block is available, the intra prediction mode of the first neighboring block is derived into the first candidate intra prediction mode S960, S980.

It is determined whether only the intra prediction mode of the second neighboring block is available S965; in case only the intra prediction mode of the second neighboring block is available, the intra prediction mode of the second neighboring block is derived into the first candidate intra prediction mode S970, S980.

In case none of the intra prediction mode of the first neighboring block and the intra prediction mode of the second neighboring block is available, a planar mode is derived as the first candidate intra prediction mode while the DC mode as the second candidate intra prediction mode S975, S985.

Figure 10:
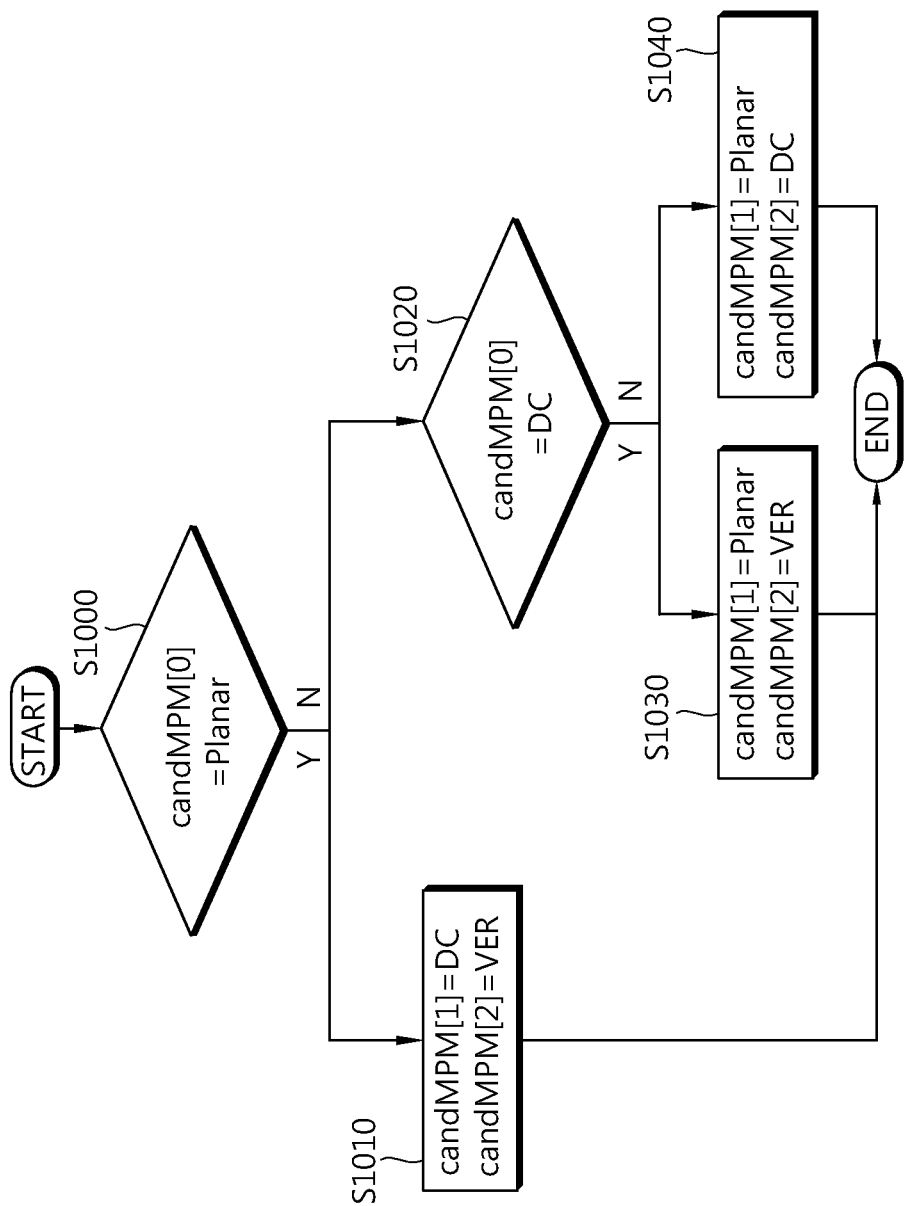
FIG. 10 is a flow diagram illustrating a method of configuring a candidate intra prediction mode when three candidate intra prediction modes are used and a first candidate intra prediction mode is configured from a neighboring block according to an exemplary embodiment of the present invention.

FIG. 10 is a flow diagram illustrating a method of deriving a candidate intra prediction mode when three candidate intra prediction modes are used and a first candidate intra prediction mode is derived from a neighboring block according to another embodiment of the present invention.

With reference to FIG. 10, it is determined whether a first candidate intra prediction mode is a planar mode S1000.

If the first candidate intra prediction mode is a planar mode, a second candidate intra prediction mode is derived into a DC mode while a third candidate intra prediction mode is derived into a vertical mode S1010.

If the first candidate intra prediction mode is not a planar mode, it is determined whether the first candidate intra prediction mode is a DC mode S1020.

If the first candidate intra prediction mode is a DC mode, the second candidate intra prediction mode is derived into a planar mode while the third candidate intra prediction modes is derived into a vertical mode S1030.

If the first candidate intra prediction mode is not a DC mode, the second candidate intra prediction mode is derived into a planar mode while the third candidate intra prediction modes is derived into a DC mode S1040.

Figure 11:
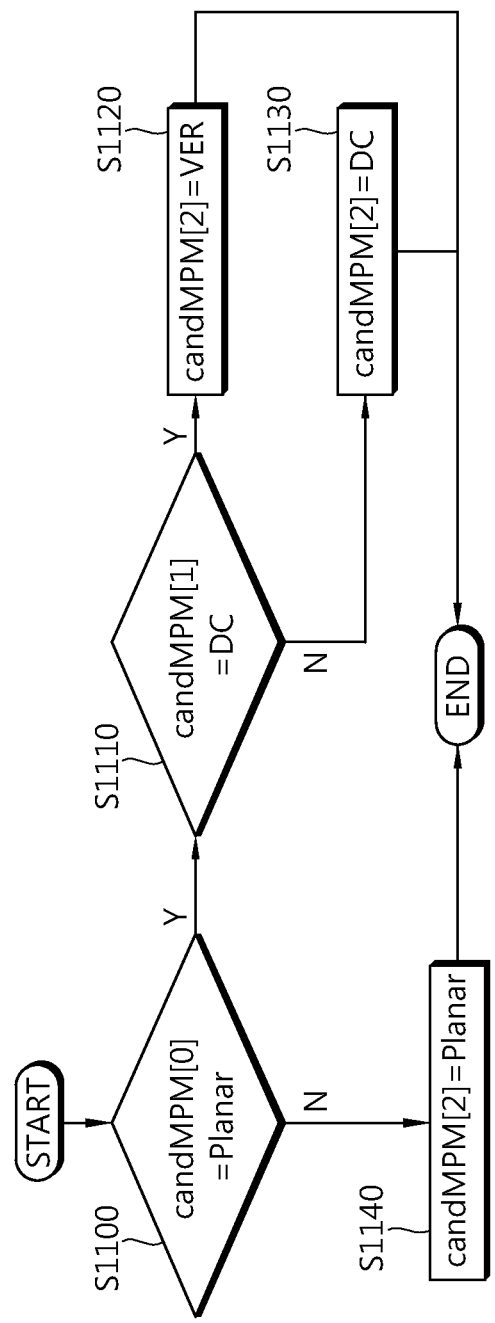
FIG. 11 is a flow diagram illustrating a method of configuring a candidate intra prediction mode when three candidate intra prediction modes are used and a first candidate intra prediction mode and a second candidate intra prediction mode are configured from a neighboring block according to an exemplary embodiment of the present invention.

FIG. 11 is a flow diagram illustrating a method of deriving a candidate intra prediction mode when three candidate intra prediction modes are used and a first candidate intra prediction mode and a second candidate intra prediction mode are derived from a neighboring block according to another embodiment of the present invention.

It is determined whether a first candidate intra prediction mode is a planar mode S1100.

If the first candidate intra prediction mode is a planar mode, it is determined whether a second intra prediction mode is a DC mode S1110.

If the first candidate intra prediction mode is a planar mode and the second candidate intra prediction mode is a DC mode, a third candidate intra prediction mode is derived into a vertical mode S1120.

If the first candidate intra prediction mode is a planar mode and the second candidate intra prediction mode is not a DC mode, the second candidate prediction mode is derived into a DC mode S1130.

If the first candidate intra prediction mode is not a planar mode, the third candidate intra prediction mode is derived into a planar mode S1140.

Figure 12:
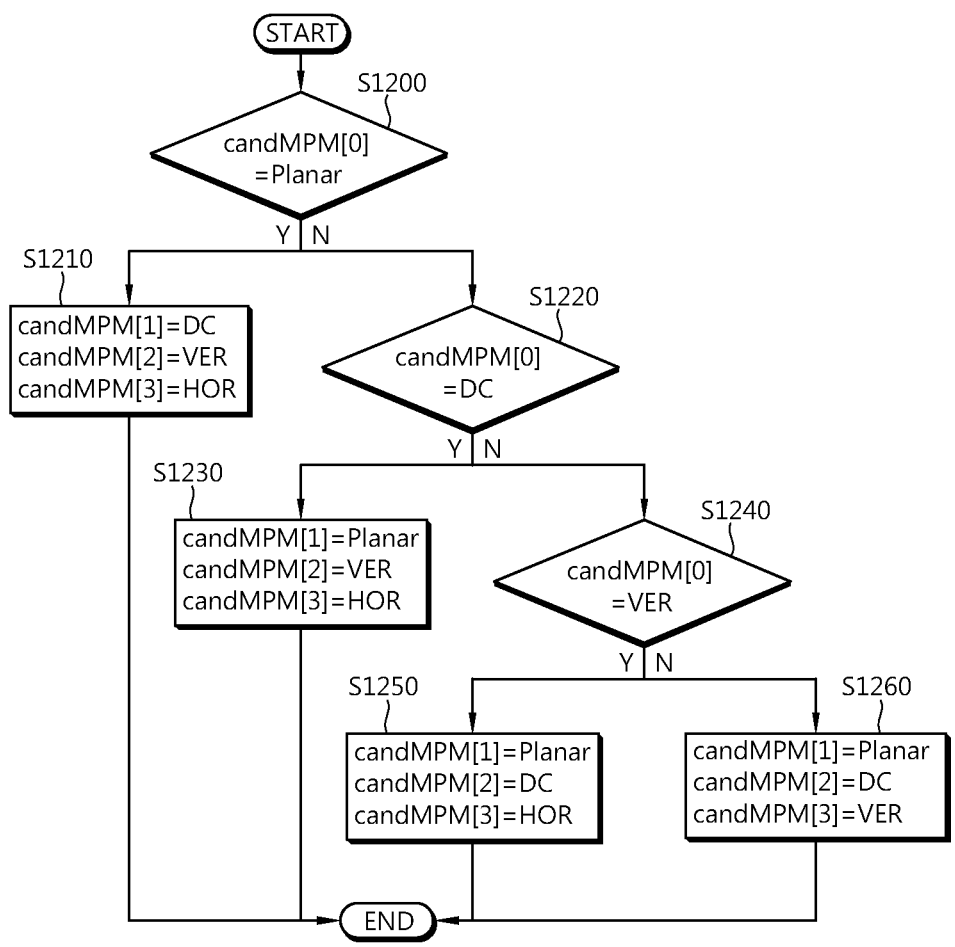
FIG. 12 is a flow diagram illustrating a method of configuring a candidate intra prediction mode when four candidate intra prediction modes are used and a first candidate intra prediction mode is configured from a neighboring block according to an exemplary embodiment of the present invention.

FIG. 12 is a flow diagram illustrating a method of configuring a candidate intra prediction mode when four candidate intra prediction modes are used and a first candidate intra prediction mode is configured from a neighboring block according to yet another embodiment of the present invention.

It is determined whether a first candidate intra prediction mode is a planar mode S1200.

If the first candidate intra prediction mode is a planar mode, a second candidate intra prediction mode is derived into a DC mode; a third candidate intra prediction mode is derived into a vertical mode; and a fourth candidate intra prediction mode is derived into a horizontal mode S1210.

If the first candidate intra prediction mode is not a planar mode, it is determined whether the first candidate intra prediction mode is a DC mode S1220.

If the first candidate intra prediction mode is a DC mode, the second candidate intra prediction mode is derived into a planar mode; the third candidate intra prediction mode is derived into a vertical mode; and the fourth candidate intra prediction mode is derived into a horizontal mode S1230.

If the first candidate intra prediction mode is not a DC mode, it is determined whether the first candidate intra prediction mode is a vertical mode S1240.

If the first candidate intra prediction mode is a vertical mode, the second candidate intra prediction mode is derived into a planar mode; the third candidate intra prediction mode is derived into a DC mode; and the fourth candidate intra prediction mode is derived into a horizontal mode S1250.

If the first candidate intra prediction mode is not a vertical mode, the second candidate intra prediction mode is derived into a planar mode; the third candidate intra prediction mode is derived into a DC mode; and the fourth candidate intra prediction mode is derived into a vertical mode S1260.

Figure 13:
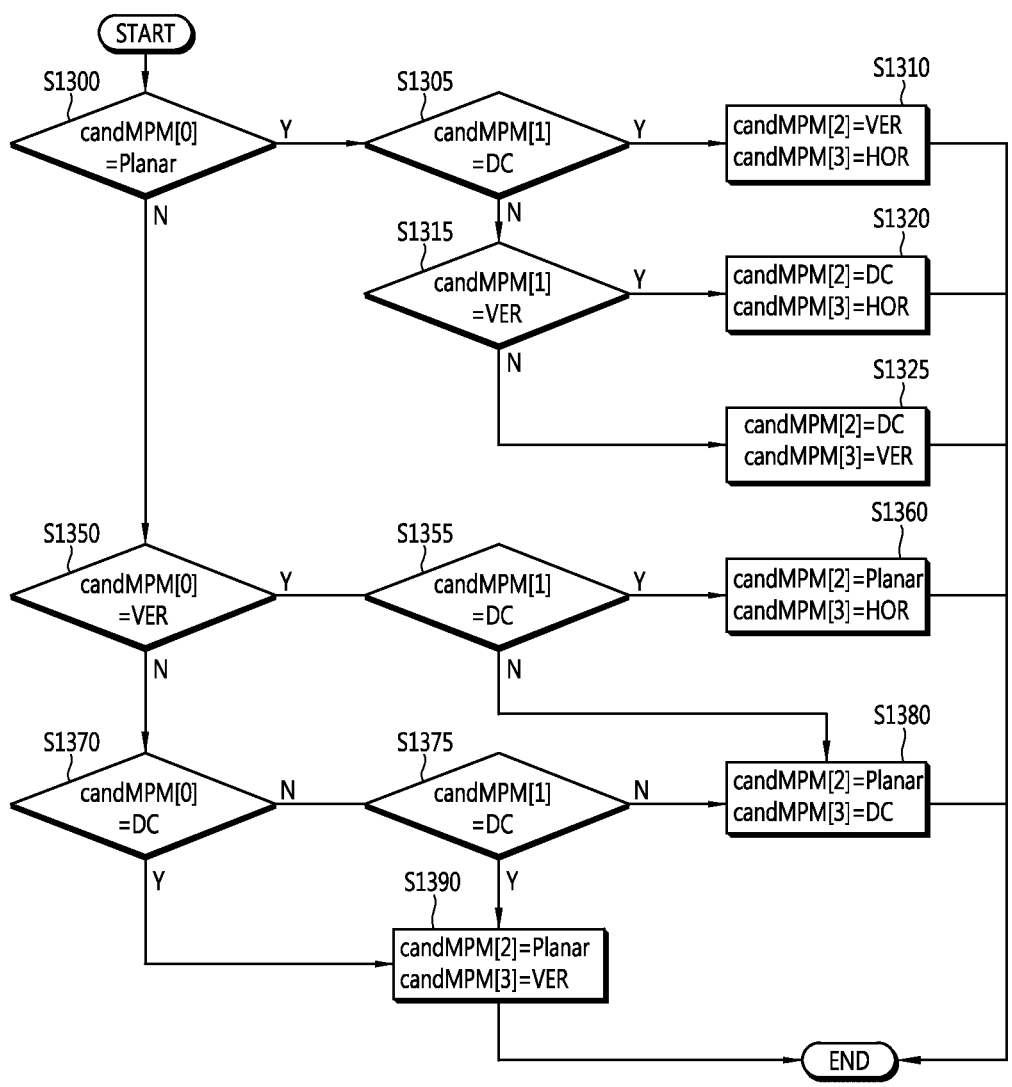
FIG. 13 is a flow diagram illustrating a method of configuring a candidate intra prediction mode when four candidate intra prediction modes are used and a first candidate intra prediction mode and a second candidate intra prediction mode are configured from a neighboring block according to an exemplary embodiment of the present invention.

FIG. 13 is a flow diagram illustrating a method of configuring a candidate intra prediction mode when four candidate intra prediction modes are used and a first candidate intra prediction mode and a second candidate intra prediction mode are configured from a neighboring block according to still another embodiment of the present invention.

With reference to FIG. 13, it is determined whether a first candidate intra prediction mode is a planar mode S1300.

If the first candidate intra prediction mode is a planar mode, it is determined whether a second candidate intra prediction mode is a DC mode S1305.

If the first candidate intra prediction mode is a planar mode and the second candidate intra prediction mode is a DC mode, a third candidate intra prediction mode is derived into a vertical mode and a fourth candidate intra prediction mode is derived into a horizontal mode S1310.

If the first candidate intra prediction mode is a planar mode and the second candidate intra prediction mode is not a DC mode, it is determined whether the second candidate intra prediction mode is a vertical mode S1315.

If the first candidate intra prediction mode is a planar mode and the second candidate intra prediction mode is a vertical mode, the third candidate intra prediction mode is derived into a DC mode and the fourth candidate intra prediction mode is derived into a horizontal mode S1320.

If the first candidate intra prediction mode is a planar mode and the second candidate intra prediction mode is a vertical mode but is not a DC mode, the third candidate intra prediction mode is derived into a DC mode and the fourth candidate intra prediction mode is derived into a vertical mode S1325.

If the first candidate intra prediction mode is not a planar mode, it is determined whether the first candidate intra prediction mode is a vertical mode S1350.

If the first candidate intra prediction mode is a vertical mode, it is determined whether the second candidate intra prediction mode is a DC mode S1355.

If the first candidate intra prediction mode is a vertical mode and the second candidate intra prediction mode is a DC mode, the third candidate intra prediction mode is derived into a planar mode and the fourth candidate intra prediction mode is derived into a horizontal mode S1360.

If the first candidate intra prediction mode is a vertical mode and the second candidate intra prediction mode is not a DC mode, the third candidate intra prediction mode is configure to be a planar mode and the fourth candidate intra prediction mode is configure to be a DC mode S1380.

It is determined whether the first candidate intra prediction mode is a DC mode S1370.

If the first candidate intra prediction mode is not a DC mode, it is determined whether the second candidate intra prediction mode is a DC mode S1375.

If the first and the second candidate intra prediction modes are not a DC mode, the third candidate intra prediction mode is derived into a planar mode and the fourth candidate intra prediction mode is derived into a DC mode S1380.

If the first candidate intra prediction mode is a DC mode and if the second candidate intra prediction mode is a DC mode though the first candidate intra prediction mode is not a DC mode, the third candidate intra prediction mode is derived into a planar mode and the fourth candidate intra prediction mode is derived into a vertical mode S1390.

Meanwhile, as shown in the examples of Tables 7 to 9, in case of using four candidate intra prediction modes, too, a current intra prediction mode can be decoded in the same way as described above.

Figure 14:
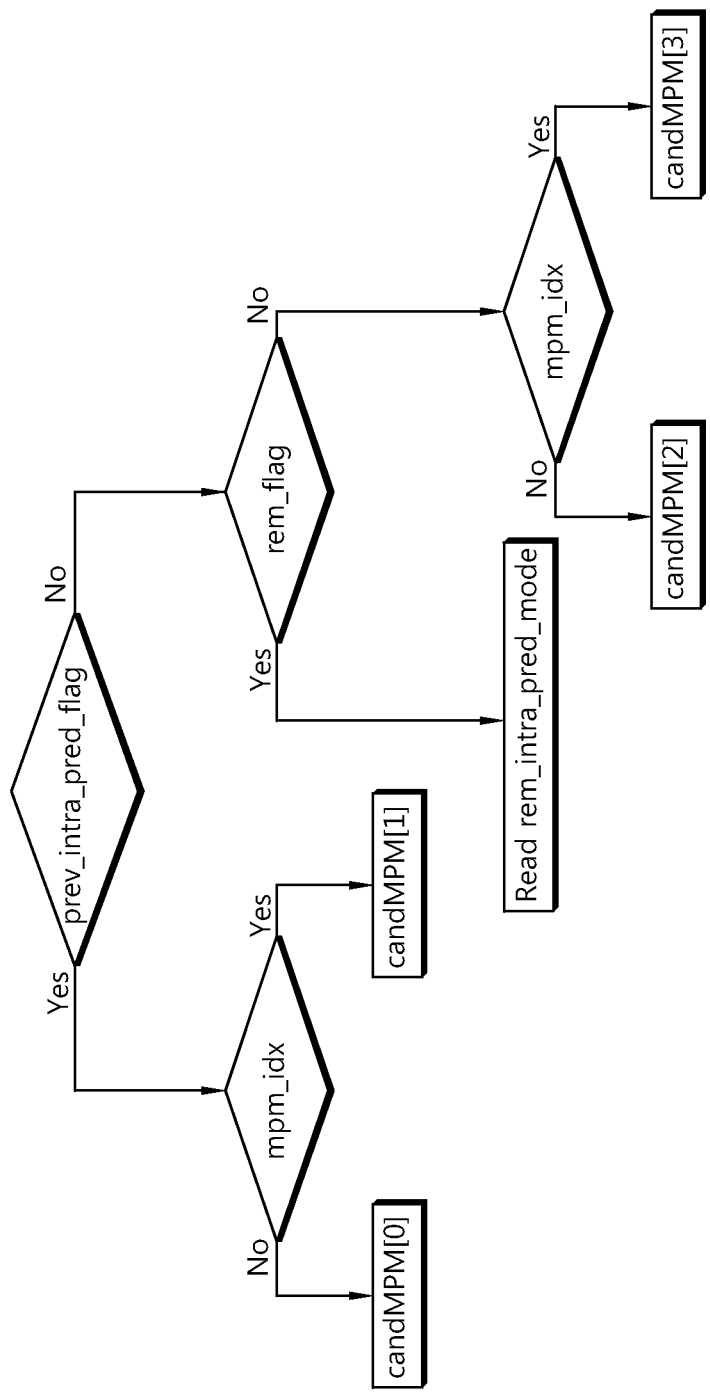
FIG. 14 is a flow diagram illustrating a method of decoding an intra prediction mode of a current block according to an exemplary embodiment of the present invention.

FIG. 14 is a flow diagram illustrating a method of decoding an intra prediction mode of a current block according to a further embodiment of the present invention.

The embodiment of FIG. 14 relates to the case where four candidate intra prediction modes are employed, illustrating the embodiment for which the mapping relationship between the intra prediction mode of a current block and the codeword described in Table 8.

With reference to FIG. 14, it is determined whether the intra prediction mode of the current block is identical to a first candidate intra prediction mode or a second candidate intra prediction mode.

In order to determine whether the intra prediction mode of a current block is the same as the first candidate intra prediction mode or the second candidate intra prediction mode, prev_intra_pred_flag can be used, which is the predetermined flag information indicating whether the intra prediction mode of the current block is the same as the first candidate intra prediction mode or the second candidate intra prediction mode. In case prev_intra_pred_flag is 1, it indicates that the intra prediction mode of the current block is the same as the first candidate intra prediction mode or the second candidate intra prediction mode; in case prev_intra_pred_flag is 0, it indicates that the intra prediction mode of the current block is different from the first candidate intra prediction mode or the second candidate intra prediction mode.

In case prev_intra_pred_flag is 1, by using an index mpm_idx which indicates whether the intra prediction mode of the current block is the same as the first candidate intra prediction mode or the second candidate intra prediction mode, the intra prediction mode of the current block can be derived.

mpm_idx is checked and if mpm_idex is 0, the intra prediction mode of the current block can be determined to be the first candidate intra prediction mode, while, if mpm_idex is 1, the intra prediction mode of the current block can be derived into the second candidate intra prediction mode.

In case prev_intra_pred_flag is 0, it is determined whether the intra prediction mode of the current block is the same as a third candidate intra prediction mode or a fourth candidate intra prediction mode.

In case prev_intra_pred_flag is 0, rem_flag can be used, which is the predetermined flag information indicating whether the intra prediction mode of a current block is identical to a third candidate intra prediction mode or a fourth candidate intra prediction mode. As one embodiment, in case rem_flag is 0, the intra prediction mode of the current block may be the same as the third candidate intra prediction mode or the fourth candidate intra prediction mode, while, in case rem_flag is 1, the intra prediction mode of the current block may not be the same as the third candidate intra prediction mode and the fourth candidate intra prediction mode.

In case rem_flag is 0, by using an index mpm_idx which indicates whether the intra prediction mode of the current block is the same as the third candidate intra prediction mode or the fourth candidate intra prediction mode, the intra prediction mode of the current block can be expressed.

mpm_idx is checked and if mpm_idex is 0, the intra prediction mode of the current block can be determined to be the third candidate intra prediction mode, while, if mpm_idex is 1, the intra prediction mode of the current block can be derived into the fourth candidate intra prediction mode.

In case rem_flag is 1, the intra prediction mode of the current block can be identical to the remaining intra prediction mode.

In other words, a decoder can receive the codeword described in Table 3 and/or Table 4; can decode intra prediction mode information of a current block assigned to the corresponding codeword.

Figure 15:
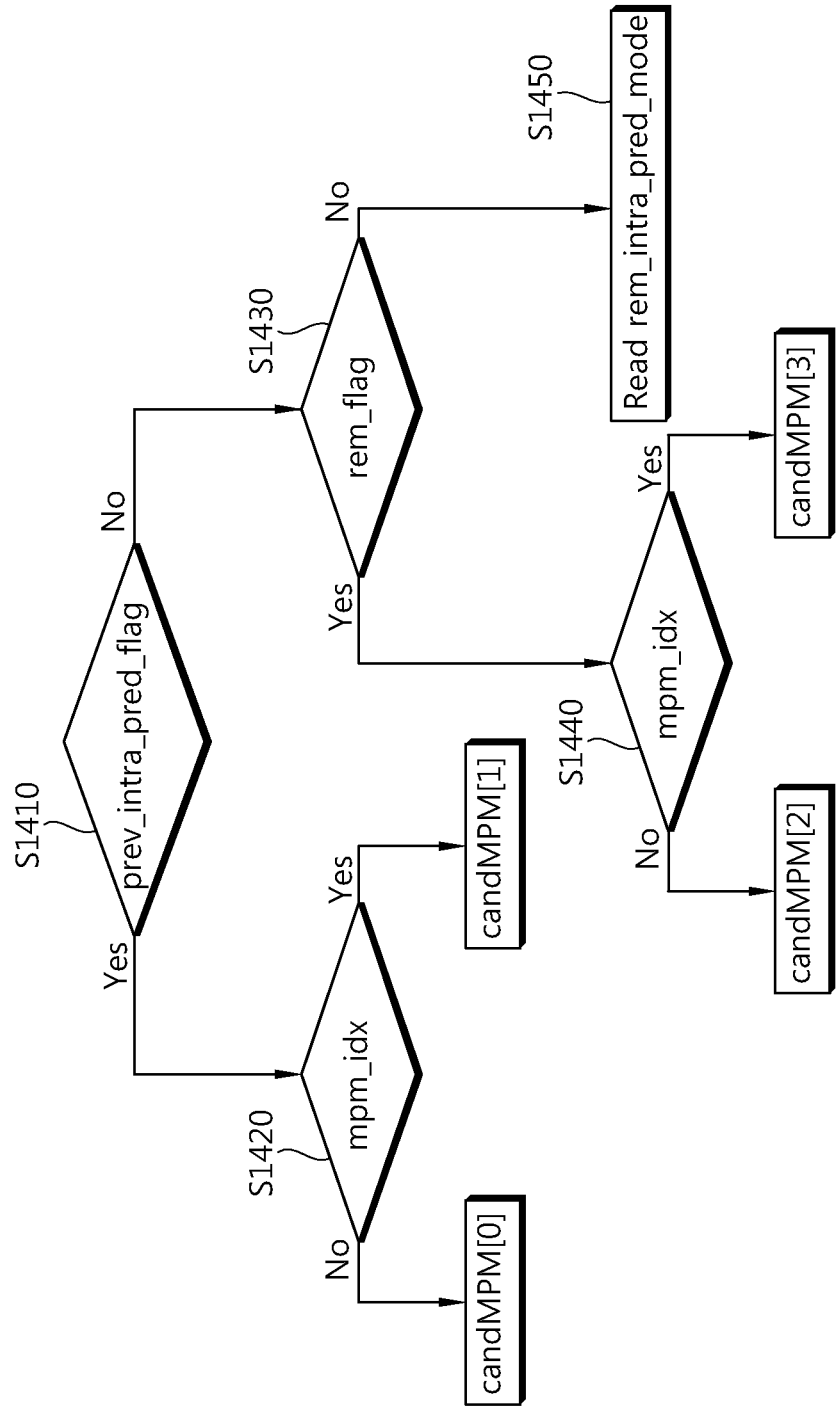
FIG. 15 is a flow diagram illustrating a method of decoding an intra prediction mode of a current block according to an exemplary embodiment of the present invention.

FIG. 15 is a flow diagram illustrating a method of decoding an intra prediction mode of a current block according to an additional embodiment of the present invention.

The embodiment of FIG. 15 also illustrates a method of decoding an intra prediction mode when four candidate intra prediction modes are employed. FIG. 15 discloses a method of decoding an intra prediction mode based on the mapping relationship between the intra prediction mode of a current block and the codeword described in Table 9.

With reference to FIG. 15, it is determined whether the intra prediction mode of the current block is identical to a first candidate intra prediction mode or a second candidate intra prediction mode S1410.

In order to determine whether the intra prediction mode of a current block is the same as the first candidate intra prediction mode or the second candidate intra prediction mode, prev_intra_pred_flag can be used, which is the predetermined flag information indicating whether the intra prediction mode of the current block is the same as the first candidate intra prediction mode or the second candidate intra prediction mode. In case prev_intra_pred_flag is 1, it indicates that the intra prediction mode of the current block is the same as the first candidate intra prediction mode or the second candidate intra prediction mode; in case prev_intra_pred_flag is 0, it indicates that the intra prediction mode of the current block is different from the first candidate intra prediction mode or the second candidate intra prediction mode.

In case prev_intra_pred_flag is 1, by using an index mpm_idx which indicates whether the intra prediction mode of the current block is the same as the first candidate intra prediction mode or the second candidate intra prediction mode, the intra prediction mode of the current block can be derived.

mpm_idx is checked S1420 and if mpm_idex is 0, the intra prediction mode of the current block can be determined to be the first candidate intra prediction mode, while, if mpm_idx is 1, the intra prediction mode of the current block can be derived into the second candidate intra prediction mode.

In case prev_intra_pred_flag is 0, it is determined whether the intra prediction mode of the current block is the same as a third candidate intra prediction mode or a fourth candidate intra prediction mode S1430.

In case prev_intra_pred_flag is 0, rem_flag can be used, which is the predetermined flag information indicating whether the intra prediction mode of a current block is identical to a third candidate intra prediction mode or a fourth candidate intra prediction mode. As one embodiment, in case rem_flag is 1, the intra prediction mode of the current block may be the same as the third candidate intra prediction mode or the fourth candidate intra prediction mode, while, in case rem_flag is 0, the intra prediction mode of the current block may not be the same as the third candidate intra prediction mode and the fourth candidate intra prediction mode.

In case rem_flag is 1, by using an index mpm_idx which indicates whether the intra prediction mode of the current block is the same as the third candidate intra prediction mode or the fourth candidate intra prediction mode, the intra prediction mode of the current block can be expressed.

mpm_idx is checked S1440 and if mpm_idex is 0, the intra prediction mode of the current block can be determined to be the third candidate intra prediction mode, while, if mpm_idex is 1, the intra prediction mode of the current block can be derived into the fourth candidate intra prediction mode.

In case rem_flag is 0, the intra prediction mode of the current block can be identical to the remaining intra prediction mode S1450.

In other words, a decoder can receive the codeword described in Table 3 and/or Table 4; can decode intra prediction mode information of a current block assigned to the corresponding codeword.

The method of decoding a current intra prediction mode described in detail above can be represented by the syntax in accordance with an embodiment of Table 10. Table 10, being relates to what has been described in FIG. 15, is an example about a method of signaling a syntax element needed for encoding a current intra prediction mode.

TABLE 10 prev_intra_pred_flag[ x0 ][ y0 ]
if( prev_intra_pred_flag[ x0 ][ y0 ] )
   mpm_idx[ x0 ][ y0 ]
else if(rem_flag)
   mpm_idx[ x0 ][ y0 ]
else
   rem_intra_pred_mode[ x0 ][ y0 ]

Figure 16:
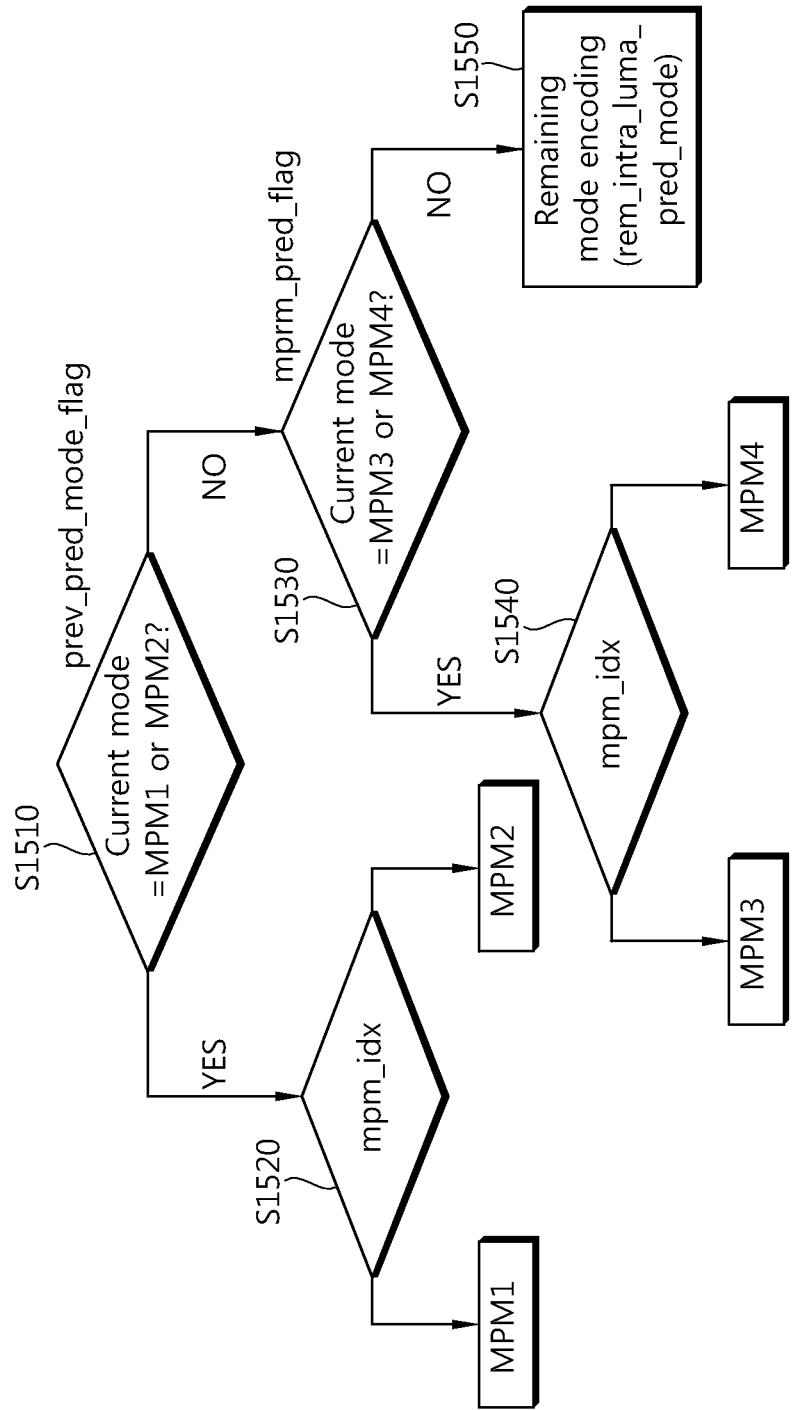
FIG. 16 is a flow diagram illustrating a method of decoding a current intra prediction mode according to an exemplary embodiment of the present invention.

FIG. 16 is a flow diagram illustrating a method of decoding a current intra prediction mode according to a yet additional embodiment of the present invention.

FIG. 16 also relates to the case of using four candidate intra prediction modes, describing an embodiment applying a mapping relationship between the intra prediction mode of a current block and the codeword described in Table 9.

With reference to FIG. 16, it is determined whether the intra prediction mode of the current block is identical to a first candidate intra prediction mode MPM1 or a second candidate intra prediction mode MPM2, S1510.

In order to determine whether the intra prediction mode of a current block is the same as the first candidate intra prediction mode or the second candidate intra prediction mode, prev_intra_pred_flag can be used, which is the predetermined flag information indicating whether the intra prediction mode of the current block is the same as the first candidate intra prediction mode or the second candidate intra prediction mode. In case prev_intra_pred_flag is 1, it indicates that the intra prediction mode of the current block is the same as the first candidate intra prediction mode or the second candidate intra prediction mode; in case prev_intra_pred_flag is 0, it indicates that the intra prediction mode of the current block is different from the first candidate intra prediction mode or the second candidate intra prediction mode.

In case prev_intra_pred_flag is 1, by using an index mpm_idx which indicates whether the intra prediction mode of the current block is the same as the first candidate intra prediction mode or the second candidate intra prediction mode, the intra prediction mode of the current block can be derived.

mpm_idx is checked S1520 and if mpm_idex is 0, the intra prediction mode of the current block can be determined to be the first candidate intra prediction mode, while, if mpm_idex is 1, the intra prediction mode of the current block can be derived into the second candidate intra prediction mode.

In case prev_intra_pred_flag is 0, it is determined whether the intra prediction mode of the current block is the same as a third candidate intra prediction mode MPM3 or a fourth candidate intra prediction mode MPM4, S1530.

In case prev_intra_pred_flag is 0, mprm_pred_flag can be used, which is the predetermined flag information indicating whether the intra prediction mode of a current block is identical to a third candidate intra prediction mode or a fourth candidate intra prediction mode. As one embodiment, in case mprm_pred_flag is 1, the intra prediction mode of the current block may be the same as the third candidate intra prediction mode or the fourth candidate intra prediction mode, while, in case mprm_pred_flag is 0, the intra prediction mode of the current block may not be the same as the third candidate intra prediction mode and the fourth candidate intra prediction mode.

In case mprm_pred_flag is 1, by using an index mpm_idx which indicates whether the intra prediction mode of the current block is the same as the third candidate intra prediction mode or the fourth candidate intra prediction mode, the intra prediction mode of the current block can be expressed.

mpm_idx is checked S1540 and if mpm_idex is 0, the intra prediction mode of the current block can be determined to be the third candidate intra prediction mode, while, if mpm_idex is 1, the intra prediction mode of the current block can be derived into the fourth candidate intra prediction mode.

In case mprm_pred_flag is 0, the intra prediction mode of the current block can be identical to the remaining intra prediction mode S1550.

In other words, a decoder can receive the codeword described in Table 3 and/or Table 4; can decode intra prediction mode information of a current block assigned to the corresponding codeword.

The method of decoding a current intra prediction mode described in detail above can be represented by the syntax in accordance with an embodiment of Table 11. The syntax elements can be configured in various ways depending on embodiments. Table 11 illustrates an example where a prediction mode about luminance component of a current block is decoded. In this case, the example of Table 11, compared with the example of Table 10, indicates that prev_intra_pred_flag may be substituted with prev_intra_luma_pred_flag, while rem_intra_pred_mode may be substituted with rem_intra_luma_pred_mode; however, the syntax elements are transferred according to the same syntax structure as shown in Table 10. Therefore, it can be noticed from the examples of Tables 10 and 11 that the syntax elements corresponding to each other carry out the same or similar functions in a method of encoding a current intra prediction mode according to the present invention.

TABLE 11 prev_intra_luma_pred_flag[ x0 ][ y0 ]
if( prev_intra_luma_pred_flag[ x0 ][ y0 ] )
   mpm_idx[ x0 ][ y0 ]
else if(mprm_pred_flag[ x0 ][ y0 ])
   mprm_idx[ x0 ][ y0 ]
else
   rem_intra_luma_pred_mode[ x0 ][ y0 ]

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for decoding an intra prediction mode of a current block, comprising:
   determining whether a first intra prediction mode derived from a first neighboring block located at the left side of the current block is identical to a second intra prediction mode derived from a second neighboring block located at the upper side of the current block;
   in response to a determination that the first intra prediction mode is not identical to the second intra prediction mode, deriving a first candidate intra prediction mode from the first intra prediction mode and deriving a second candidate intra prediction mode from the second intra prediction mode and, based on priority of order among a planar mode, a DC mode, and a vertical mode, deriving a third candidate intra prediction mode different from the first candidate intra prediction mode and the second candidate intra prediction mode; and in response to a determination that the first intra prediction mode is identical to the second intra prediction mode, determining whether the first and second intra prediction modes are identical to the DC mode and, in response to determining that the first and second intra prediction modes are identical to the DC mode, setting the first candidate intra prediction mode equal to the planar mode, setting the second candidate intra prediction mode equal to the DC mode, and setting the third candidate intra prediction mode equal to the vertical mode, wherein three candidate intra prediction modes are arranged according to an order of the first candidate intra prediction mode, the second candidate intra prediction mode, and the third candidate intra prediction mode.

2. The method of claim 1, wherein deriving of the third candidate intra prediction mode comprises:

if none of the first candidate intra prediction mode and the second candidate intra prediction mode is the planar mode, setting the third candidate intra prediction mode equal to the planar mode;

if one of the first candidate intra prediction mode and the second candidate intra prediction mode is the planar mode, and the other is not the DC mode, setting the third candidate intra prediction mode equal to the DC mode; and if one of the first candidate intra prediction mode and the second candidate intra prediction mode is the planar mode, and the other is the DC mode, setting the third candidate intra prediction mode equal to the vertical mode.

3. The method of claim 1, wherein the first neighboring block corresponds to a block including a pixel positioned at (x−1, y) when a position of an upper-left pixel of the current block is (x, y); and the second neighboring block corresponds to a block including a pixel positioned at (x, y−1) when the position of the upper-left pixel of the current block is (x, y), where the x and y are an integer value.

4. The method of claim 3, further comprising:

decoding information indicating whether one of the first candidate intra prediction mode, the second candidate intra prediction mode, and the third candidate intra prediction mode is identical to the intra prediction mode of the current block; and if one of the first candidate intra prediction mode, the second candidate intra prediction mode, and the third candidate intra prediction mode is identical to the intra prediction mode of the current block, deriving the intra prediction mode of the current block based on the identical one from among the first, second, and third candidate intra prediction modes.

5. The method of claim 1, further comprising:

decoding information indicating whether one of the first candidate intra prediction mode, the second candidate intra prediction mode, and the third candidate intra prediction mode is identical to the intra prediction mode of the current block; and if none of the first candidate intra prediction mode, the second candidate intra prediction mode, and the third candidate intra prediction mode is identical to the intra prediction mode of the current block, deriving the intra prediction mode of the current block based on a remaining intra prediction mode different from the first candidate intra prediction mode, the second candidate intra prediction mode, and the third candidate intra prediction mode.

6. The method of claim 5, wherein deriving of the intra prediction mode of the current block based on the remaining intra prediction mode different from the first candidate intra prediction mode, the second candidate intra prediction mode, and the third candidate intra prediction mode if none of the first candidate intra prediction mode, the second candidate intra prediction mode, and the third candidate intra prediction mode is identical to the intra prediction mode of the current block comprises:

deriving the intra prediction mode of the current block by comparing the remaining intra prediction mode with the first candidate intra prediction mode, the second candidate intra prediction mode, and the third candidate intra prediction mode, respectively.

7. An image decoding apparatus, comprising:

an entropy decoding unit configured to decode information indicating whether one candidate intra prediction mode from among a first candidate intra prediction mode, a second candidate intra prediction mode, and a third candidate intra prediction mode is identical to an intra prediction mode of a current block, the first, second, and third candidate intra prediction modes being three candidate intra prediction modes for the current block; and a predictor configured to derive the intra prediction mode of the current block based on the information, wherein, if a first intra prediction mode derived from a first neighboring block located at the left side of the current block is not identical to a second intra prediction mode derived from a second neighboring block located at the upper side of the current block, the predictor is configured to derive the first candidate intra prediction mode from the first intra prediction mode, to derive the second candidate intra prediction mode from the second intra prediction mode, and to derive, based on priority of order of a planar mode, a DC mode, and a vertical mode, the third candidate intra prediction mode different from the first candidate intra prediction mode and the second candidate intra prediction mode, wherein, if the first intra prediction mode derived from the first neighboring block located at the left side of the current block is identical to the second intra prediction mode derived from the second neighboring block located at the upper side of the current block, the predictor, in response to determining that the first and second intra prediction modes are identical to the DC mode, is configured to set the first candidate intra prediction mode equal to the planar mode, to set the second candidate intra prediction mode equal to the DC mode, and to set the third candidate intra prediction mode equal to the vertical mode, and wherein three candidate intra prediction modes are arranged according to an order of the first candidate intra prediction mode, the second candidate intra prediction mode, and the third candidate intra prediction mode.

8. The apparatus of claim 7, wherein the predictor is configured to set the third candidate intra prediction mode equal to the planar mode if none of the first candidate intra prediction mode and the second candidate intra prediction mode is the planar mode; the predictor is configured to set the third candidate intra prediction mode equal to the DC mode if one of the first candidate intra prediction mode and the second candidate intra prediction mode is the planar mode, and the other is not the DC mode; and the predictor is configured to set the third candidate intra prediction mode equal to the vertical mode if one of the first candidate intra prediction mode and the second candidate intra prediction mode is the planar mode, and the other is the DC mode.

9. The apparatus of claim 8, wherein the first neighboring block corresponds to a block including a pixel positioned at (x−1, y) when a position of an upper-left pixel of the current block is (x, y); and the second neighboring block corresponds to a block including a pixel positioned at (x, y−1) when the position of the upper-left pixel of the current block is (x, y), where the x and y are an integer value.

10. The apparatus of claim 9, wherein the predictor, if one of the first, second, and third candidate intra prediction modes is identical to the intra prediction mode of the current block, is configured to derive the intra prediction mode of the current block based on the identical one from among the first, second, and third candidate intra prediction modes; and if none of the first, second, and third candidate intra prediction modes is identical to the intra prediction mode of the current block, the predictor is configured to derive the intra prediction mode of the current block based on a remaining intra prediction mode different from the first candidate intra prediction mode, the second candidate intra prediction mode, and the third candidate intra prediction mode.

11. The apparatus of claim 10, wherein the predictor, if none of the first, second, and third candidate intra prediction modes is identical to the intra prediction mode of the current block, is configured to derive the intra prediction mode of the current block by comparing the remaining intra prediction mode with the first candidate intra prediction mode, the second candidate intra prediction mode, and the third candidate intra prediction mode, respectively.

* * * * *